United States Patent
Shimizu et al.

(10) Patent No.: US 10,125,414 B2
(45) Date of Patent: Nov. 13, 2018

(54) METHOD OF PRODUCING HOT-DIP ZN ALLOY-PLATED STEEL SHEET

(71) Applicant: NISSHIN STEEL CO., LTD., Tokyo (JP)

(72) Inventors: Atsuo Shimizu, Osaka (JP); Masanori Matsuno, Osaka (JP); Masaya Yamamoto, Osaka (JP); Hirofumi Taketsu, Osaka (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 15/606,254

(22) Filed: May 26, 2017

(65) Prior Publication Data

US 2017/0260614 A1    Sep. 14, 2017

Related U.S. Application Data

(62) Division of application No. 15/037,489, filed as application No. PCT/JP2014/005717 on Nov. 13, 2014, now abandoned.

(30) Foreign Application Priority Data

Dec. 3, 2013 (JP) ................................ 2013-250143

(51) Int. Cl.
*C23C 2/06* (2006.01)
*C23C 2/26* (2006.01)
(Continued)

(52) U.S. Cl.
CPC .............. *C23C 2/06* (2013.01); *B32B 15/013* (2013.01); *C22C 18/00* (2013.01); *C22C 18/04* (2013.01);
(Continued)

(58) Field of Classification Search
CPC ........... C23C 2/06; C23C 2/26; C23C 22/361; C23C 22/78; C23C 2/28; C23C 18/48;
(Continued)

(56) References Cited

U.S. PATENT DOCUMENTS 6,677,058 B1    1/2004   Komatsu et al.
2010/0035055 A1   2/2010   Okai et al.
(Continued)

FOREIGN PATENT DOCUMENTS

CN    101027422 A    8/2007
JP    61-238952 A    10/1986
(Continued)

OTHER PUBLICATIONS

S. Feliu Jr. et al. "XPS study of the surface chemistry of conventional hot-dip galvanised pure Zn, galvanneal and Zn-Al alloy coatings on steel." Acta Materialia. 51. pp. 5413-5424. (Oct. 2003).
(Continued)

*Primary Examiner* — Michael E. La Villa
(74) *Attorney, Agent, or Firm* — Brundidge & Stanger, P.C.

(57) ABSTRACT

A method of producing a hot-dip Zn alloy-plated steel sheet includes: dipping a base steel sheet in a hot-dip Zn alloy plating bath to form a hot-dip Zn alloy plating layer on a surface of the base steel sheet; and contacting an aqueous solution containing a water-soluble corrosion inhibitor with a surface of the hot-dip Zn alloy plating layer to cool the base steel sheet and the hot-dip Zn alloy plating layer having a raised temperature through formation of the hot-dip Zn alloy plating layer. A temperature of the surface of the hot-dip Zn alloy plating layer when the aqueous solution is to be contacted with the surface of the hot-dip Zn alloy plating layer is equal to or more than 100° C. and equal to or less than a solidifying point of the plating layer. The
(Continued)

aqueous solution containing the water-soluble corrosion inhibitor satisfies the Equation $[\{(Z_0-Z_1)/Z_0\}100 \geq 20]$.

1 Claim, 9 Drawing Sheets

(51) Int. Cl.
| | |
|---|---|
| C23C 22/62 | (2006.01) |
| C23C 18/48 | (2006.01) |
| C23C 2/40 | (2006.01) |
| B32B 15/01 | (2006.01) |
| C23F 11/06 | (2006.01) |
| C22C 18/00 | (2006.01) |
| C22C 18/04 | (2006.01) |
| C23C 22/36 | (2006.01) |
| C23C 22/78 | (2006.01) |
| C22C 21/10 | (2006.01) |
| C23C 2/12 | (2006.01) |
| C23C 2/28 | (2006.01) |

(52) U.S. Cl.
CPC ............ C22C 21/10 (2013.01); C23C 2/12 (2013.01); C23C 2/26 (2013.01); C23C 2/28 (2013.01); C23C 2/40 (2013.01); C23C 18/48 (2013.01); C23C 22/361 (2013.01); C23C 22/62 (2013.01); C23C 22/78 (2013.01); C23F 11/06 (2013.01)

(58) Field of Classification Search
CPC .. C23C 2/40; C23C 2/12; C23C 22/62; C23C 2/04; C23C 2/00; C23C 2/16; C23C 2/18; C23C 2/20; C22C 18/00; C22C 18/04; C22C 21/10; B32B 15/013
See application file for complete search history.

(56) References Cited

U.S. PATENT DOCUMENTS

| | | |
|---|---|---|
| 2015/0259776 A1 | 9/2015 | Shimizu et al. |
| 2016/0305003 A1 | 10/2016 | Shimizu et al. |

FOREIGN PATENT DOCUMENTS

| | | | |
|---|---|---|---|
| JP | 63-297576 A | | 12/1988 |
| JP | 06-336664 A | | 12/1994 |
| JP | 11-200000 A | | 7/1999 |
| JP | 2002-226958 A | | 8/2002 |
| JP | 2008-169470 A | | 7/2008 |
| JP | 5356616 B1 | | 12/2013 |
| KR | 10-2002-0041029 A | | 6/2002 |
| WO | 2006/035527 A1 | | 4/2006 |
| WO | WO 2014/083713 | * | 6/2014 |

OTHER PUBLICATIONS

Elisabete Almeida a. et al. "Oxidising alternative species to chromium VI in zinc galvanised steel surface treatment. Part 1—A morphological and chemical study." Surface and Coatings Technology. 106. pp. 8-17. (Jul. 1998).

International Search Report from International Application No. PCT/JP2014/005717 dated Feb. 10, 2015.

Office Action issued in U.S. Appl. No. 15/037,439, dated Nov. 29, 2016.

Restriction Requirement issued in U.S. Appl. No. 15/037,439, dated Aug. 29, 2016.

"Elemental analysis of surfaces of solids by auger spectroscopy and x-ray photoelectrons." (Feb. 1998).

Extended European Search Report issued in EP 14868634.8, dated Jul. 27, 2017.

* cited by examiner

METHOD OF PRODUCING HOT-DIP ZN ALLOY-PLATED STEEL SHEET

CROSS-REFERENCE TO RELATED APPLICATIONS

This application is a divisional of U.S. patent application Ser. No. 15/037,489, filed on May 18, 2016, which is a National Stage Application of International Application No. PCT/JP2014/005717, filed on Nov. 13, 2014, the disclosure of which, including the specification, drawings and abstract, is incorporated herein by reference in their entirety. International Application No. PCT/JP2014/005717 is entitled to and claims the benefit of Japanese Patent Application No. 2013-250143, filed on Dec. 3, 2013, the disclosures of which, including the specifications, drawings and abstracts, are incorporated herein by reference in their entirety.

TECHNICAL FIELD

The present invention relates to a hot-dip Zn alloy-plated steel sheet excellent in blackening resistance and a method of producing the same.

BACKGROUND ART

As a plated steel sheet excellent in corrosion resistance, a hot-dip Zn alloy-plated steel sheet having a base steel sheet with a surface coated with a hot-dip Zn alloy plating layer including Al and Mg is known. The composition of the plating layer of a hot-dip Zn alloy-plated steel sheet includes, for example, 4.0 to 15.0% by mass of Al, 1.0 to 4.0% by mass of Mg, 0.002 to 0.1% by mass of Ti, 0.001 to 0.045% by mass of B, and the balance of Zn and unavoidable impurities. The hot-dip Zn alloy-plated steel sheet includes a plating layer of mixed metal structure of [primary crystal Al] and [single phase Zn] in a matrix of [Al/Zn/$Zn_2$Mg ternary eutectic structure], having sufficient corrosion resistance and surface appearance as an industrial product.

The hot-dip Zn alloy-plated steel sheet described above can be continuously produced by the following steps. First, a base steel sheet (steel strip) is passed through a furnace, dipped in a hot-dip Zn alloy plating bath, and then passed through, for example, a gas wiping apparatus, such that the amount of the molten metal adhered to the surface of the base steel sheet is adjusted to a specified amount. Subsequently, the steel strip with the specified amount of molten metal adhered thereto is passed through an air jet cooler and a mist cooling zone, so that the molten metal is cooled to form a hot-dip Zn alloy plating layer. Further, the steel strip with the hot-dip Zn alloy plating layer is passed through a water quenching zone, so as to come in contact with cooling water. A hot-dip Zn alloy-plated steel sheet is thus obtained.

The hot-dip Zn alloy-plated steel sheet thus produced, however, allows the surface of the plating layer to be blackened over time in some cases. Since the progress of blackening of a hot-dip Zn alloy-plated steel sheet spoils the appearance with a dark gray color without metallic luster, a method for suppressing the blackening has been needed.

As a method for preventing the blackening, adjusting the temperature of the surface of a plating layer in the water quenching zone has been proposed (e.g. refer to PTL 1). In the invention described in PTL 1, the temperature of the surface of a plating layer is adjusted at lower than 105° C. when to be contacted with cooling water in the water quenching zone so that blackening of the surface of a plating layer is prevented. Alternatively, instead of the temperature control of the surface of a plating layer at lower than 105° C., readily oxidizable elements (rare earth elements, Y, Zr or Si) are added into a plating bath and the temperature of the surface of a plating layer is adjusted at 105 to 300° C. so that blackening of the surface of the plating layer is prevented.

CITATION LIST

Patent Literature

PTL 1
Japanese Patent Application Laid-Open No.2002-226958

SUMMARY OF INVENTION

Technical Problem

In the invention described in PTL 1, since the surface of a plating layer is required to be cooled to a specified temperature before passed through a water quenching zone, the production of hot-dip Zn alloy-plated steel sheets is restricted in some cases. For example, the feed rate of a plated steel sheet having a large thickness is required to be slow so that the plated steel sheet is cooled to a specified temperature, resulting in reduced productivity. In addition, in the case of adding a readily oxidizable element into a plating bath, the readily oxidizable element tends to form a dross. Consequently, complicated concentration control of the readily oxidizable element is required, resulting in a complicated production process, which has been a problem.

An object of the present invention is to provide a hot-dip Zn alloy-plated steel sheet excellent in blackening resistance which can be produced without reduction in productivity and without complicated control of the components of a plating bath, and a method of producing the same.

Solution to Problem

The present inventors have found that the problem can be solved by reducing the ratio of $Zn(OH)_2$ at the surface of a plating layer, and accomplished the present invention through further study.

The present invention relates to the following hot-dip Zn alloy-plated steel sheet.

[1] A hot-dip Zn alloy-plated steel sheet comprising: a steel sheet; and a hot-dip Zn alloy plating layer disposed on a surface of the steel sheet, wherein the hot-dip Zn alloy plating layer satisfies, at the whole of a surface of the hot-dip Zn alloy plating layer, the following Equation 1:

$$\frac{S[Zn(OH)_2]}{S[Zn(OH)_2] + S[Zn]} \times 100 \leq 40 \qquad \text{(Equation 1)}$$

wherein S[Zn] is a peak area derived from metal Zn and centered at approximately 1022 eV in an intensity profile of XPS analysis of the surface of the hot-dip Zn alloy plating layer; and $S[Zn(OH)_2]$ is a peak area derived from $Zn(OH)_2$ and centered at approximately 1023 eV in the intensity profile of XPS analysis of the surface of the hot-dip Zn alloy plating layer.

[2] The hot-dip Zn alloy-plated steel sheet according to [1], wherein: the hot-dip Zn alloy plating layer comprises 1.0 to 22.0% by mass of Al, 0.1 to 10.0% by mass of Mg, and the balance of the hot-dip Zn alloy plating layer being Zn and unavoidable impurities.

[3] The hot-dip Zn alloy-plated steel sheet according to [2], wherein: the hot-dip Zn alloy plating layer further comprises at least one selected from the group consisting of 0.001 to 2.0% by mass of Si, 0.001 to 0.1% by mass of Ti, and 0.001 to 0.045% by mass of B.

The present invention also relates to the following method of producing a hot-dip Zn alloy-plated steel sheet.

[4] A method of producing a hot-dip Zn alloy-plated steel sheet comprising:

dipping a base steel sheet in a hot-dip Zn alloy plating bath to form a hot-dip Zn alloy plating layer on a surface of the base steel sheet; and contacting an aqueous solution containing a water-soluble corrosion inhibitor with the surface of the hot-dip Zn alloy plating layer to cool the base steel sheet and the hot-dip Zn alloy plating layer having a raised temperature through formation of the hot-dip Zn alloy plating layer, wherein a temperature of the surface of the hot-dip Zn alloy plating layer when the aqueous solution is to be contacted with the surface of the hot-dip Zn alloy plating layer is equal to or more than 100° C. and equal to or less than a solidifying point of the plating layer; and wherein the aqueous solution containing the water-soluble corrosion inhibitor satisfies the following Equation 2:

$$\frac{Z_0 - Z_1}{Z_0} \times 100 \geq 20 \qquad \text{(Equation 2)}$$

$Z_0$ is a corrosion current density of the hot-dip Zn alloy-plated steel sheet measured in a 0.5 M NaCl aqueous solution not containing the water-soluble corrosion inhibitor, and $Z_1$ is a corrosion current density of the hot-dip Zn alloy-plated steel sheet measured in the aqueous solution containing the water-soluble corrosion inhibitor, in which NaCl is further dissolved so that a final concentration of NaCl is 0.5 M.

Advantageous Effects of Invention

According to the present invention, a hot-dip Zn alloy-plated steel sheet excellent in blackening resistance can be easily produced at high productivity.

Figure 1A:
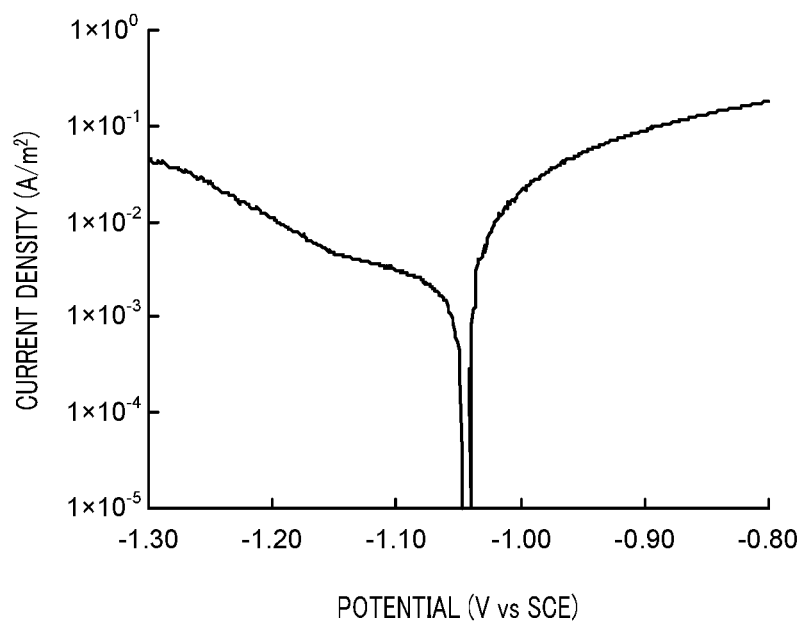
FIG. 1A is a graph illustrating an exemplary polarization curve of a hot-dip Zn alloy-plated steel sheet in 0.5 M NaCl aqueous solution including no water-soluble corrosion inhibitor.

DESCRIPTION OF EMBODIMENTS (Method of Producing Hot-Dip Zn Alloy-Plated Steel Sheet of the Present Invention)

The method of producing a hot-dip Zn alloy-plated steel sheet of the present invention (hereinafter, also referred to as "plated steel sheet") includes: (1) a first step of forming a hot-dip Zn alloy plating layer (hereinafter, also referred to as "plating layer") on the surface of a base steel sheet; and (2) a second step of contacting a specified aqueous solution with the surface of the plating layer to cool the base steel sheet and the plating layer at a raised temperature through formation of the plating layer.

One of the features of the production method of the present invention is that after formation of a hot-dip Zn alloy plating layer, a specified cooling aqueous solution is contacted with the surface of the plating layer so as to suppress blackening of the plating layer. Each of the steps is described as follows.

(1) First Step

In the first step, a base steel sheet is dipped in a hot-dip Zn alloy plating bath, so that a hot-dip Zn alloy plating layer is formed on the surface of the base steel sheet.

First, a base steel sheet is dipped in a hot-dip Zn alloy plating bath, and a specified amount of molten metal is allowed to adhere on the surface of the base steel sheet by gas wiping or the like.

The type of the base steel sheet is not particularly limited. For example, a steel sheet made of low-carbon steel, medium-carbon steel, high-carbon steel, alloy steel or the like may be used as the base steel sheet. When excellent press formability is required, a steel sheet for deep drawing made of low-carbon Ti-alloyed steel, low-carbon Nb-alloyed steel or the like is preferably used as the base steel sheet. Alternatively, a high-strength steel sheet containing P, Si, Mn and the like may be used.

The composition of a plating bath may be appropriately selected corresponding to the composition of a hot-dip Zn alloy plating layer to be formed. For example, the plating bath includes 1.0 to 22.0% by mass of Al, 0.1 to 10.0% by mass of Mg, and the balance of Zn and unavoidable impurities. The plating bath may further include at least one selected from the group consisting of 0.001 to 2.0% by mass of Si, 0.001 to 0.1% by mass of Ti, and 0.001 to 0.045% by mass of B. Examples of the hot-dip Zn alloy plating include a molten Zn-0.18% by mass of Al-0.09% by mass of Sb alloy plating, a molten Zn-0.18% by mass of Al-0.06% by mass of Sb alloy plating, a molten Zn-0.18% by mass Al alloy plating, a molten Zn-1% by mass of Al-1% by mass of Mg alloy plating, a molten Zn-1.5% by mass of Al-1.5% by mass of Mg alloy plating, a molten Zn-2.5% by mass of Al-3% by mass of Mg alloy plating, a molten Zn-2.5% by mass of Al-3% by mass of Mg-0.4% by mass of Si alloy plating, a molten Zn-3.5% by mass of Al-3% by mass of Mg alloy plating, a molten Zn-4% by mass of Al-0.75% by mass of Mg alloy plating, a molten Zn-6% by mass of Al-3% by mass of Mg-0.05% by mass of Ti-0.003% by mass of B alloy plating, a molten Zn-6% by mass of Al-3% by mass of Mg-0.02% by mass of Si-0.05% by mass of Ti-0.003% by mass of B alloy plating, a molten Zn-11% by mass of Al-3% by mass of Mg alloy plating, a molten Zn-11% by mass of Al-3% by mass of Mg-0.2% by mass of Si alloy plating, and a molten Zn-55% by mass of Al-1.6% by mass of Si alloy plating. Although blackening of a plating layer can be suppressed by addition of Si as described in PTL 1, blackening of a plating layer can be suppressed without addition of Si in the case of producing a plated steel sheet by the production method of the present invention.

The adhering amount of the hot-dip Zn alloy plating layer is not specifically limited. The adhering amount of the plating layer may be, for example, approximately 60 to 500 g/m$^2$.

Subsequently, the molten metal adhered to the surface of a base steel sheet is cooled to a temperature equal to or more than 100° C. and equal to or less than the solidifying point of the plating layer so as to be solidified. A plated steel sheet is thus formed, having a plating layer with a composition approximately the same as the composition of the plating bath, on the surface of the base steel sheet.

(2) Second step

In the second step, a specified cooling aqueous solution is contacted with the surface of the hot-dip Zn alloy plating layer, so that the base steel sheet and the plating layer at a raised temperature through formation of the hot-dip Zn alloy plating layer are cooled. From the viewpoint of productivity, the second step is performed preferably by water quenching (water cooling). In this case, the temperature of the surface of the hot-dip Zn alloy plating layer when the cooling aqueous solution is to be contacted with the surface of the hot-dip Zn alloy plating layer is equal to or more than 100° C. and approximately equal to or less than the solidifying point of the plating layer.

The cooling aqueous solution is formed of an aqueous solution containing a water-soluble corrosion inhibitor, satisfying the following equation 3. The following equation 3 indicates that the cooling aqueous solution has a reduction ratio of the corrosion current density of 20% or more.

$$\frac{Z_0 - Z_1}{Z_0} \times 100 \geq 20 \quad \text{(Equation 3)}$$

wherein $Z_0$ is the corrosion current density of a hot-dip Zn alloy-plated steel sheet, measured in a 0.5 M NaCl aqueous solution containing no water-soluble corrosion inhibitor; and $Z_1$ is the corrosion current density of a hot-dip Zn alloy-plated steel sheet, measured in the aqueous solution (cooling aqueous solution) containing the water-soluble corrosion inhibitor, with further dissolved NaCl at a final concentration of 0.5 M.

Although NaCl is added to the cooling aqueous solution to have a final concentration of 0.5 M in the measurement of the corrosion current density in the cooling aqueous solution as described above, the hot-dip Zn alloy-plated steel sheet is cooled with the cooling aqueous solution as it is, without addition of NaCl to the cooling aqueous solution.

Figure 1B:
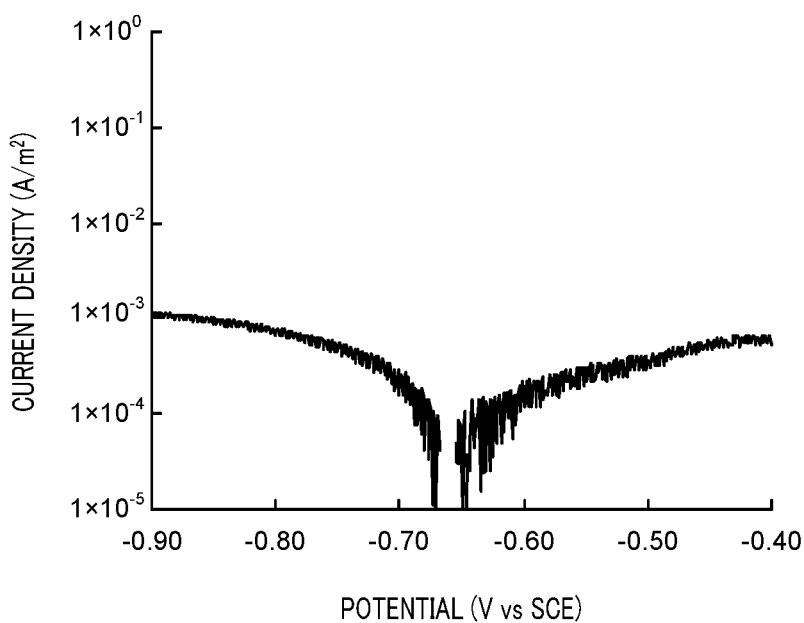
FIG. 1B is a graph illustrating an exemplary polarization curve of a hot-dip Zn alloy-plated steel sheet in 0.5 M NaCl aqueous solution containing a water-soluble corrosion inhibitor.

The corrosion current density values $Z_0$ and $Z_1$ for use in the equation 3 are obtained from a polarization curve by Tafel extrapolation method. The measurement of the polarization curve is performed using an electrochemical measurement system (HZ-3000, produced by Hokuto Denko Corp.). The corrosion current is calculated using software (data analysis software) attached to the electrochemical measurement system. FIG. 1A is a graph illustrating an exemplary polarization curve of a hot-dip Zn alloy-plated steel sheet in 0.5 M NaCl aqueous solution including no water-soluble corrosion inhibitor. FIG. 1B is a graph illustrating an exemplary polarization curve of a hot-dip Zn alloy-plated steel sheet in 0.5 M NaCl aqueous solution containing a water-soluble corrosion inhibitor. As shown therein, the corrosion current density in the 0.5 M NaCl aqueous solution containing a water-soluble corrosion inhibitor is at least 20% smaller than the corrosion current density measured in the 0.5 M NaCl aqueous solution containing no water-soluble corrosion inhibitor.

The method for preparing the aqueous solution (cooling aqueous solution) containing a water-soluble corrosion inhibitor is not specifically limited. For example, a water-soluble corrosion inhibitor capable of reducing the corrosion current density, and a dissolution promoter on an as needed basis, may be dissolved in water (solvent). The type of the water-soluble corrosion inhibitor is not specifically limited as long as capable of reducing the corrosion current density. Examples of the water-soluble corrosion inhibitor include a V compound, a Si compound, and a Cr compound. Preferable examples of the V compound include acetylacetone vanadyl, vanadium acetylacetonate, vanadium oxysulfate, vanadium pentoxide, and ammonium vanadate. Further, preferable examples of the Si compound include sodium silicate. Further, preferable examples of the Cr compound include ammonium chromate and potassium chromate. These water-soluble corrosion inhibitors may be used singly or in combination. The amount of the water-soluble corrosion inhibitor added is selected to satisfy the equation 3.

In the case of adding a dissolution promoter, the amount of the dissolution promoter added is not specifically limited. For example, 90 to 130 parts by mass of the dissolution promoter may be added to 100 parts by mass of the water-soluble corrosion inhibitor. With an excessively small amount of the dissolution promoter added, the water-soluble corrosion inhibitor cannot be sufficiently dissolved in some cases. On the other hand, with an excessively large amount of the dissolution promoter added, the effect is saturated, resulting in a cost disadvantage.

Examples of the dissolution promoter include 2-aminoethanol, tetraethylammonium hydroxide, ethylene diamine, 2,2'-iminodiethanol, and 1-amino-2-propanol.

The method for contacting the cooling aqueous solution with the surface of a hot-dip Zn alloy plating layer is not specifically limited. Examples of the method for contacting the cooling aqueous solution with the surface of a hot-dip Zn alloy plating layer include a spraying process and a dipping process.

Figure 2A:
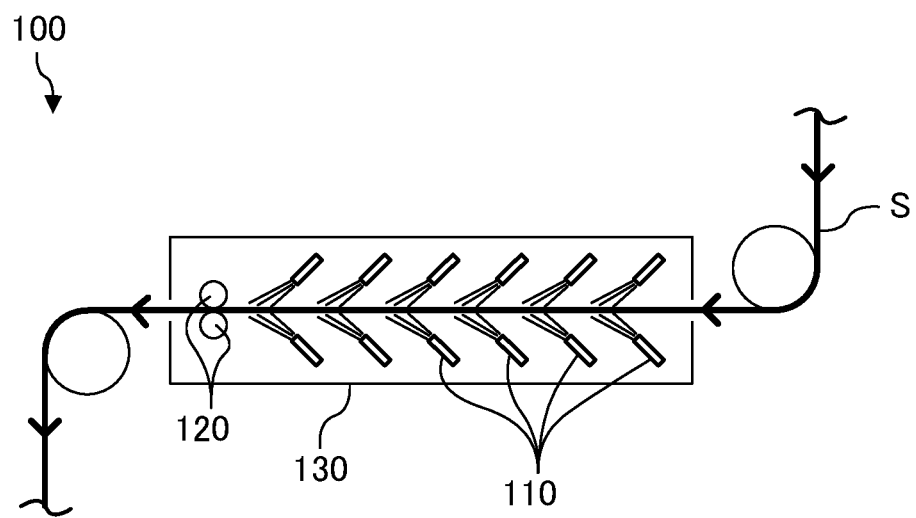
FIG. 2A illustrates an exemplary method for contacting a cooling aqueous solution with the surface of a hot-dip Zn alloy plating layer by a spraying process.
Figure 2B:
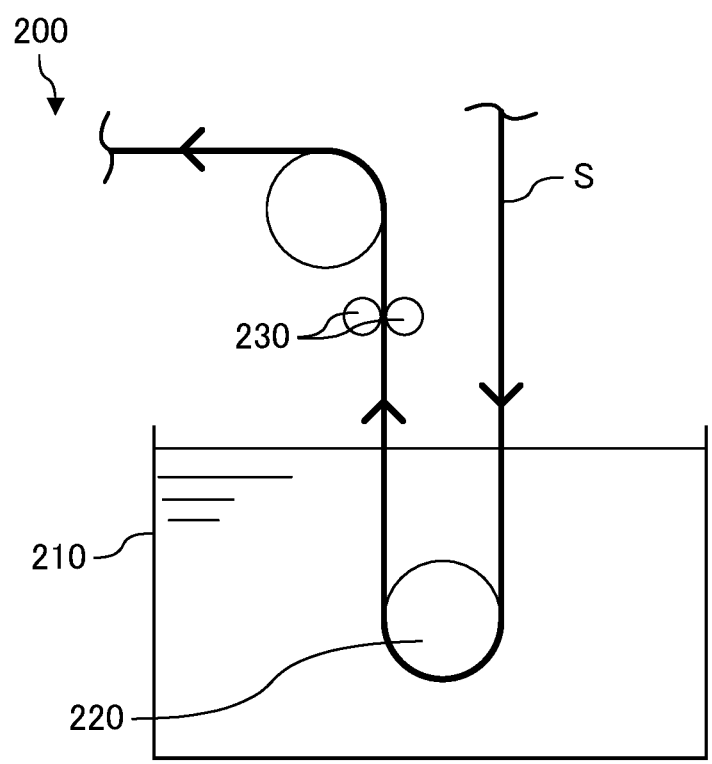
FIG. 2B illustrates an exemplary method for contacting a cooling aqueous solution with the surface of a hot-dip Zn alloy plating layer by a dipping process.

FIGS. 2A and 2B illustrate exemplary methods for contacting a cooling aqueous solution with the surface of a hot-dip Zn alloy plating layer. FIG. 2A illustrates an exemplary method for contacting a cooling aqueous solution with the surface of a hot-dip Zn alloy plating layer by a spraying process. FIG. 2B illustrates an exemplary method for contacting a cooling aqueous solution with the surface of a hot-dip Zn alloy plating layer by a dipping process.

As shown in FIG. 2A, cooling apparatus 100 for spraying process includes a plurality of spray nozzles 110, squeeze rollers 120 disposed downstream of spray nozzles 110 in the feed direction of a steel strip S, and housing 130 which covers the nozzles and the rollers. Spray nozzles 110 are disposed on both sides of the steel strip S. The steel strip S is cooled by a cooling aqueous solution supplied from spray nozzles 110 such that a water film is temporarily formed on the surface of the plating layer, inside housing 130. The cooling aqueous solution is then removed with squeeze roller 120.

As shown in FIG. 2B, cooling apparatus 200 for dipping process includes dip tank 210 in which a cooling aqueous solution is stored, dip roller 220 disposed inside dip tank 210, and squeeze rollers 230 disposed downstream of dip roller 220 in the feed direction of the steel strip S so as to remove the extra cooling aqueous solution adhered to the steel strip S. The steel strip S fed into dip tank 210 is then contacted with the cooling aqueous solution so as to be cooled. The steel strip S is then subjected to a turn of direction by the rotating dip roller 220, and pulled upward. The cooling aqueous solution is removed with squeeze rollers 230.

According to the procedure described above, a hot-dip Zn alloy-plated steel sheet excellent in blackening resistance can be produced.

The reason is not clear why the production method of the present invention can suppress the temporal blackening at the surface of a plating layer of a hot-dip Zn alloy-plated steel sheet. In the following, a presumed mechanism of the occurrence of blackening of a hot-dip Zn alloy plating layer is described, and then a presumed mechanism of the suppression of blackening is described when a hot-dip Zn alloy-plated steel sheet is produced according to the production method of the present invention. The mechanism of the suppression of blackening, however, is not limited to the hypotheses.

(Mechanism of Occurrence of Blackening)

First, the process leading to the presumed mechanisms of the occurrence of blackening of the surface of a plating layer and the suppression of the blackening is described as follows. The present inventors produced a hot-dip Zn alloy-plated steel sheet by forming a hot-dip Zn alloy plating layer having a plating composition including 6% by mass of Al, 3% by mass of Mg, 0.024% by mass of Si, 0.05% by mass of Ti, 0.003% by mass of B, and the balance of Zn on the surface of a base steel sheet, and then temporarily forming a water film from cooling water (in-factory water having a pH of 7.6, at 20° C.) in a water quenching zone for a spraying process. The term "temporarily forming a water film" means a state allowing a water film in contact with the surface of a hot-dip Zn alloy-plated steel sheet to be visually observed for one second or more. On this occasion, the surface temperature of the hot-dip Zn alloy-plated steel sheet was estimated to be approximately 160° C. immediately before formation of the water film from the cooling water.

The produced hot-dip Zn alloy-plated steel sheet was stored in a room (at a room temperature of 20° C., with a relative humidity of 60%) for one week. After storage for one week, the surface of the hot-dip Zn alloy-plated steel sheet was visually observed. The blackening developed on the whole surface of the hot-dip Zn alloy-plated steel sheet and a dark part where blackening particularly proceeded compared with the periphery was observed.

Furthermore, for 30 regions randomly selected on the surface of a hot-dip Zn alloy-plated steel sheet immediately after production, the chemical binding states of Zn, Al and Mg were analyzed by XPS analysis (X-ray Photoelectoron Spectroscopy). Then, the analyzed hot-dip Zn alloy-plated steel sheet was stored in a room (at a room temperature of 20° C., with a relative humidity of 60%) for one week. After storage for one week, the surface of the hot-dip Zn alloy-plated steel sheet was visually observed. As a result, a dark part was observed in a part of the hot-dip Zn alloy-plated steel sheet. For the region where the dark part was formed and the region where no dark part was observed (normal part), the XPS analysis results of the hot-dip Zn alloy-plated steel sheet obtained immediately after production were compared.

Figure 3A:
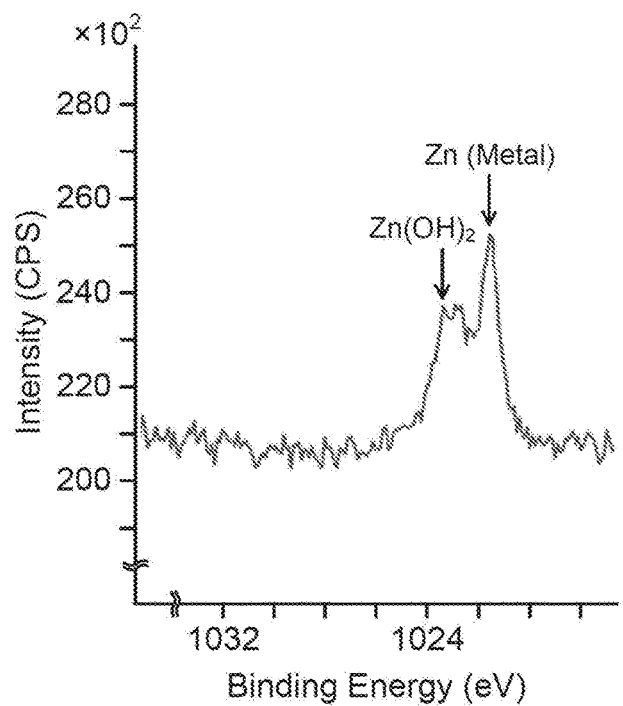
FIGS. 3A and 3B illustrate the intensity profile of the chemical binding energy corresponding to the 2p orbitals of Zn at the surface of a hot-dip Zn alloy plating layer cooled with use of a cooling water to temporarily form a water film.
Figure 3B:
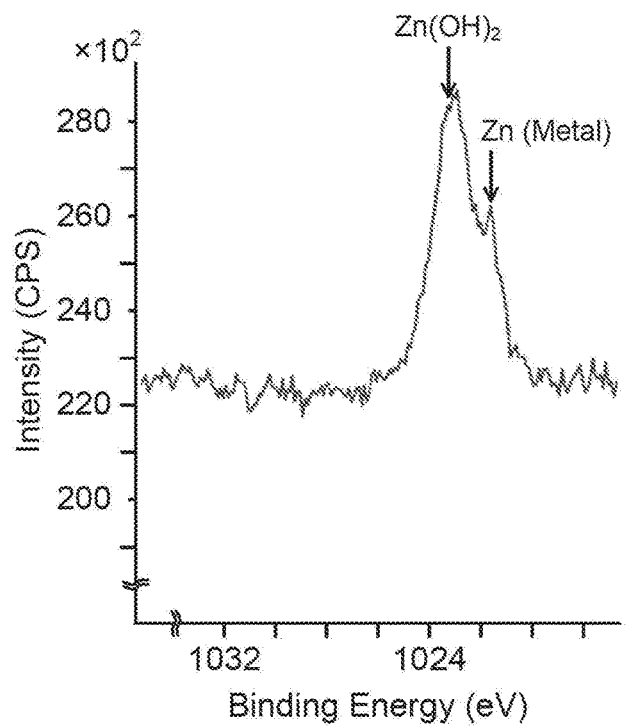
Figure 4A:
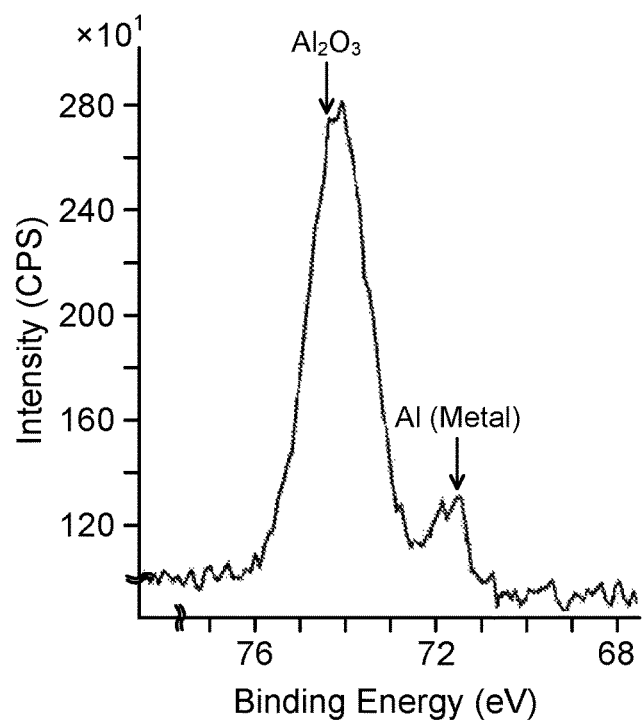
FIGS. 4A and 4B illustrate the intensity profile of the chemical binding energy corresponding to the 2p orbitals of Al at the surface of a hot-dip Zn alloy plating layer cooled with use of a cooling water to temporarily form a water film.
Figure 4B:
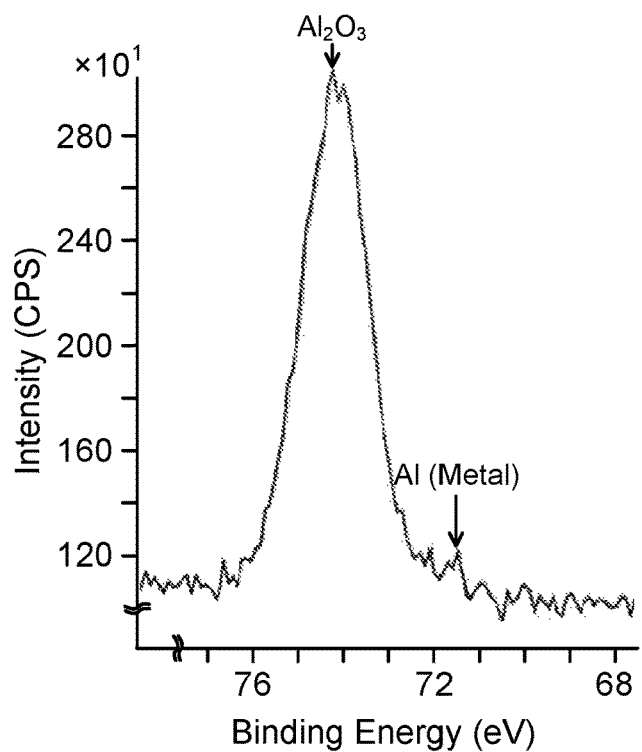
Figure 5A:
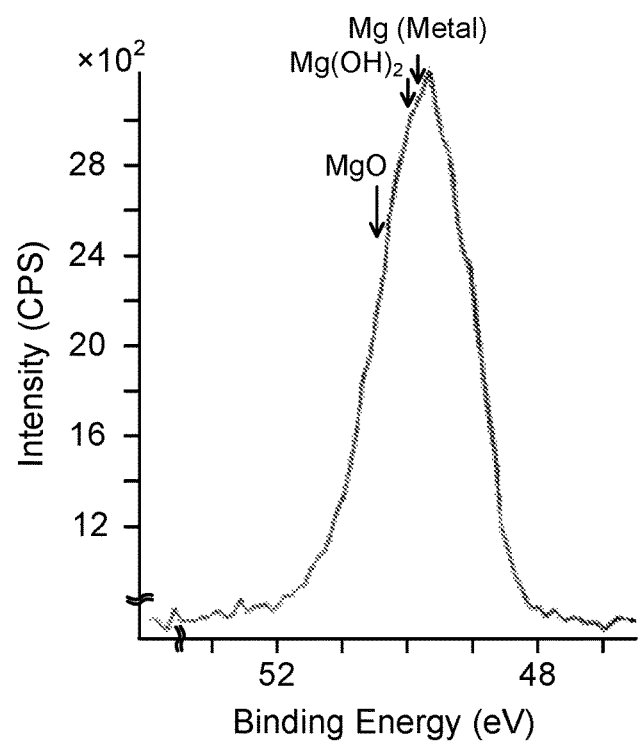
FIGS. 5A and 5B illustrate the intensity profile of the chemical binding energy corresponding to the 2p orbitals of Mg at the surface of a hot-dip Zn alloy plating layer cooled with use of a cooling water to temporarily form a water film.
Figure 5B:
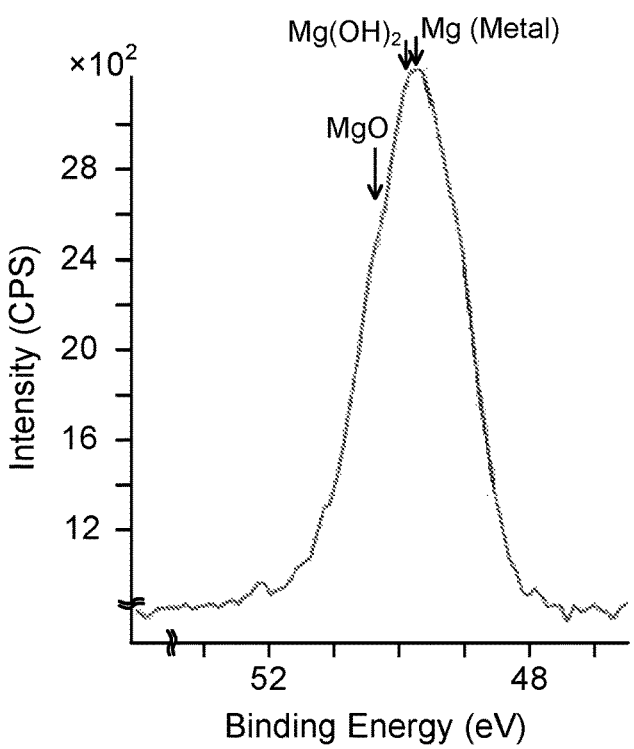

FIGS. 3A and 3B to FIGS. 5A and 5B are charts illustrating the XPS analysis results of the hot-dip Zn alloy-plated steel sheet obtained immediately after production for the normal part and the dark part. FIG. 3A illustrates the intensity profile of the chemical binding energy corresponding to the 2p orbitals of Zn in a normal part. FIG. 3B illustrates the intensity profile of the chemical binding energy corresponding to the 2p orbitals of Zn in a dark part. FIG. 4A illustrates the intensity profile of the chemical binding energy corresponding to the 2p orbitals of Al in a normal part. FIG. 4B illustrates the intensity profile of the chemical binding energy corresponding to the 2p orbitals of Al in a dark part. FIG. 5A illustrates the intensity profile of the chemical binding energy corresponding to the 2p orbitals of Mg in a normal part. FIG. 5B illustrates the intensity profile of the chemical binding energy corresponding to the 2p orbitals of Mg in a dark part.

As shown in FIG. 3A, in the analysis of Zn in a normal part, a peak derived from metal Zn at approximately 1022 eV and a peak derived from $Zn(OH)_2$ at approximately 1023 eV having a strength weaker than that of the peak derived from metal Zn were observed. From the analysis results, it is found that Zn is present not only as metal Zn, but also present as hydroxide ($Zn(OH)_2$) in the normal part. From the strength ratio between Zn and $Zn(OH)_2$, it is found that the Zn is present in larger amount than $Zn(OH)_2$ in the normal part.

On the other hand, as shown in FIG. 3B, also in the analysis of Zn in a dark part, a peak derived from metal Zn at approximately 1022 eV and a peak derived from $Zn(OH)_2$ at approximately 1023 eV having a strength stronger than that of the peak derived from metal Zn were observed. From the analysis results, it is found that Zn is present not only as metal Zn, but also present as hydroxide ($Zn(OH)_2$) in the dark part, in the same manner as in the normal part. From the strength ratio between Zn and $Zn(OH)_2$, it is found that the $Zn(OH)_2$ is present in larger amount than Zn in the dark part.

As shown in FIGS. 4A and 4B, in the analysis of Al in the normal part and the dark part, a peak derived from metal Al at approximately 72 eV and a peak derived from $Al_2O_3$ at approximately 74 eV having a strength weaker than that of the peak derived from metal Al were observed. From the analysis results, it is found that Al is present as metal Al and as oxide ($Al_2O_3$) in the normal part and the dark part. In both of the normal part and the dark part, $Al_2O_3$ is present in larger amount than Al, and no major change in the ratio of presence was observed between the normal part and the dark part.

As shown in FIGS. 5A and 5B, in the analysis of Mg in the normal part and the dark part, peaks derived from metal Mg, Mg(OH)$_2$, and MgO at approximately 49 to 50 eV were observed. From the analysis results, it is found that Mg is present as metal Mg, as oxide (MgO), and as hydroxide (Mg(OH)$_2$) in the normal part and the dark part. No major change in the ratio of presence of metal Mg, Mg(OH)$_2$, and MgO was observed between the normal part and the dark part.

From the results, it is presumed that the binding state of Zn has an effect on formation of the dark part, i.e., the rate of progress in blackening. Accordingly, it is presumed that the dark part is formed, or blackening is accelerated, due to increase in the presence ratio of Zn(OH)$_2$.

Next, the present inventors produced a hot-dip Zn alloy-plated steel sheet by contacting in-factory water (cooling water) with the surface of the hot-dip Zn alloy plating layer by a mist cooling apparatus, without formation of a water film. The produced hot-dip Zn alloy-plated steel sheet was stored in a room (at a room temperature of 20° C., with a relative humidity of 60%) for one week. After storage for one week, the surface of the hot-dip Zn alloy-plated steel sheet was visually observed. The hot-dip Zn alloy-plated steel sheet had a uniform surface gloss, and no formation of a dark part was observed. The degree of gloss at the surface of the plating layer is approximately the same as in the normal part in the hot-dip Zn alloy-plated steel sheet produced through temporary formation of a water film.

Figure 6:
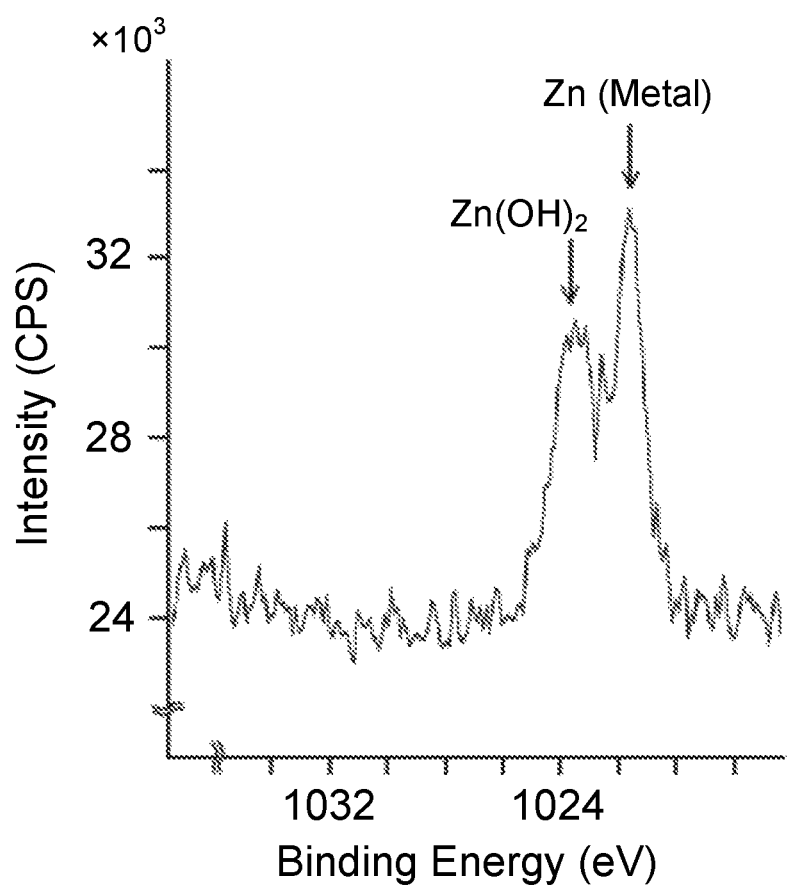
FIG. 6 illustrates the intensity profile of the chemical binding energy corresponding to the 2p orbitals of Zn at the surface of a hot-dip Zn alloy plating layer cooled with use of a cooling water, without formation of a water film.

The surface of the plating layer of the hot-dip Zn alloy-plated steel sheet immediately after production without formation of a water film was then analyzed by XPS analysis. FIG. 6 illustrates the intensity profile of the chemical binding energy corresponding to the 2p orbitals of Zn. The intensity profiles of Al and Mg are omitted. As shown in FIG. 6, a peak derived from metal Zn at approximately 1022 eV and a peak derived from Zn(OH)$_2$ at approximately 1023 eV were observed, even in the case of contact with cooling water without formation of a water film. From the strength ratio between Zn and Zn(OH)$_2$, it is found that the Zn is present in larger amount than Zn(OH)$_2$ in the normal part. Accordingly, it is presumed that the formation of Zn(OH)$_2$ is not accelerated even in the case of contact with cooling water when a water film is not formed.

From the results, it is suggested that the formation of a water film in the cooling step has an effect on the formation of Zn(OH)$_2$. In the case of no formation of a water film, Zn(OH)$_2$ is not easily formed, and it is therefore presumed that the blackening is suppressed.

As described above, regarding blackening of the plating layer of a hot-dip Zn alloy-plated steel sheet, the present inventors found that: 1) Zn(OH)$_2$ is formed on the surface of the plating layer through formation of a water film in the cooling step; and 2) blackening tends to occur in a region where Zn(OH)$_2$ is formed in the surface of the plating layer. Accordingly, the present inventors presume that the mechanism of blackening of the plating layer to be as follows.

First, when a cooling water comes in contact with the surface of a plating layer at high temperature (e.g. 100° C. or higher), partial elution of Zn from the oxide film on the surface of the plating layer or from the Zn phase in the plating layer occurs.

$$Zn \rightarrow Zn^{2+} + 2e^-$$

A part of oxygen dissolved in the cooling water is reduced to form OW.

$$1/2O_2 + H_2O + 2e^- \rightarrow 2OH^-$$

Zn$^{2+}$ eluted into cooling water bonds with OH$^-$ in the cooling water to form Zn(OH)$_2$ on the surface of the plating layer.

$$Zn^{2+} + 2OH^- \rightarrow Zn(OH)_2$$

As time passes, a part of Zn(OH)$_2$ on the surface of the plating layer forms ZnO through a dehydration reaction.

$$Zn(OH)_2 \rightarrow ZnO + H_2O$$

Subsequently, oxygen is taken from a part of ZnO by Al and Mg in the plating layer, so that ZnO$_{1-x}$ is produced. ZnO$_{1-x}$ forms a color center, visually exhibiting a black color.

(Mechanism for Suppressing Blackening)

Subsequently, the present inventors produced a hot-dip Zn alloy-plated steel sheet by using an aqueous solution of a V compound (reduction ratio of the corrosion current density: 20% or more) instead of in-factory water so as to temporarily form a water film on the surface of the plating layer in the water quenching zone for a spraying process. On this occasion, the surface temperature of the hot-dip Zn alloy-plated steel sheet immediately before contact with the cooling aqueous solution was estimated to be approximately 160° C.

The produced hot-dip Zn alloy-plated steel sheet was stored in a room (at a room temperature of 20° C., with a relative humidity of 60%) for one week. After storage for one week, the surface of the hot-dip Zn alloy-plated steel sheet was visually observed. The hot-dip Zn alloy-plated steel sheet had a practically uniform surface gloss, and no formation of a dark part was observed. The hot-dip Zn alloy-plated steel sheet had higher surface gloss in comparison with the normal part in the hot-dip Zn alloy-plated steel sheet produced through temporary formation of a water film using in-factory water.

Figure 7:
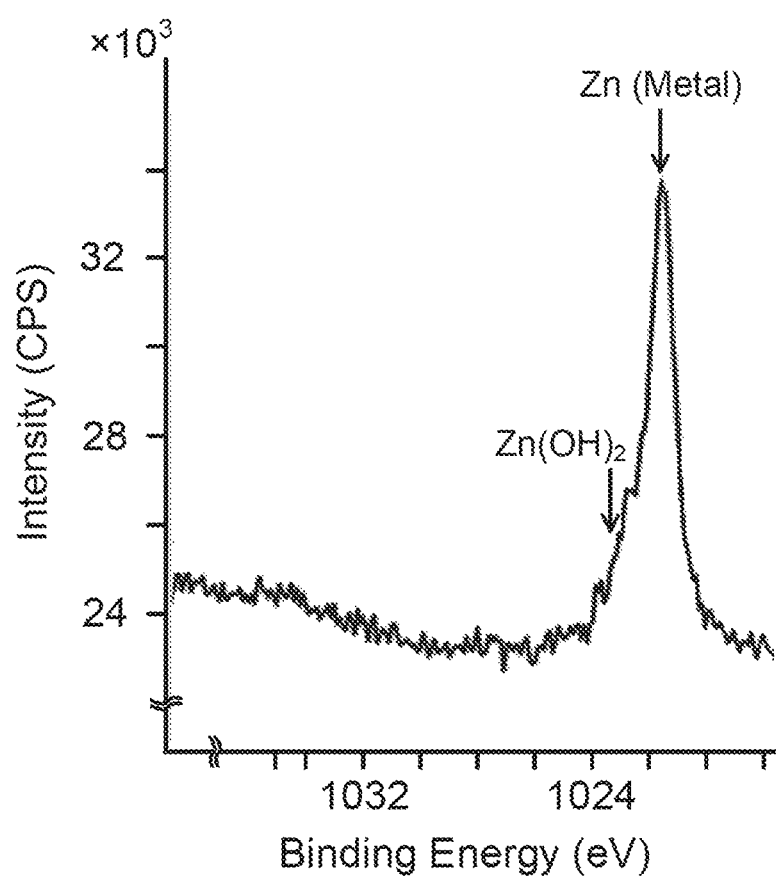
FIG. 7 illustrates the intensity profile of the chemical binding energy corresponding to the 2p orbitals of Zn at the surface of a hot-dip Zn alloy plating layer cooled with use of a cooling aqueous solution containing $V^{5+}$ to temporarily form a water film.

Subsequently, the surface of the plating layer of the hot-dip alloy plated steel sheet immediately after production through temporary formation of a water film using the cooling aqueous solution was analyzed by XPS analysis. FIG. 7 illustrates the intensity profile of the chemical binding energy corresponding to the 2p orbitals of Zn in the normal part in the case of using the cooling aqueous solution. The intensity profiles of Al and Mg are omitted. As shown in FIG. 7, a peak derived from metal Zn at approximately 1022 eV and a peak derived from Zn(OH)$_2$ at approximately 1023 eV were observed, even in the case of using the cooling aqueous solution. From the strength ratio between Zn and Zn(OH)$_2$, it is found that the Zn is present in larger amount than Zn(OH)$_2$. Accordingly, it is presumed that the formation of Zn(OH)$_2$ is not accelerated even in the case of temporary formation of a water film when an aqueous solution of the V compound (a reduction ratio of the corrosion current density of 20% or more) is used.

In the case of using an aqueous solution having a reduction ratio of the corrosion current density of 20% or more as cooling water, the progress rate of the series of reactions involved in the formation of Zn(OH)$_2$ is reduced. It is presumed that the formation of Zn(OH)$_2$ is thereby suppressed, resulting in suppressed blackening of the plating layer.

(Hot-Dip Zn Alloy-Plated Steel Sheet of the Present Invention)

In the hot-dip Zn alloy-plated steel sheet produced by the production method of the present invention (hot-dip Zn alloy-plated steel sheet of the present invention), the amount of $Zn(OH)_2$ at the surface of the hot-dip Zn alloy plating layer is small. Accordingly, the hot-dip Zn alloy plating layer satisfies, at the entire surface, the following equation 4.

$$\frac{S[Zn(OH)_2]}{S[Zn(OH)_2] + S[Zn]} \times 100 \le 40 \quad \text{(Equation 4)}$$

wherein $S[Zn]$ is a peak area derived from metal Zn and centered at approximately 1022 eV in an intensity profile of XPS analysis of the surface of the hot-dip Zn alloy plating layer; and $S[Zn(OH)_2]$ is a peak area derived from $Zn(OH)_2$ and centered at approximately 1023 eV in the intensity profile of XPS analysis of the surface of the hot-dip Zn alloy plating layer.

The equation 4 indicates that the ratio of the peak area derived from $Zn(OH)_2$ and centered at approximately 1023 eV (hereinafter referred to as "$Zn(OH)_2$ ratio") is 40% or less relative to the total of the peak area derived from metal Zn and centered at approximately 1022 eV, and peak area derived from $Zn(OH)_2$ and centered at approximately 1023 eV in the intensity profile measured in the XPS analysis.

Figure 8A:
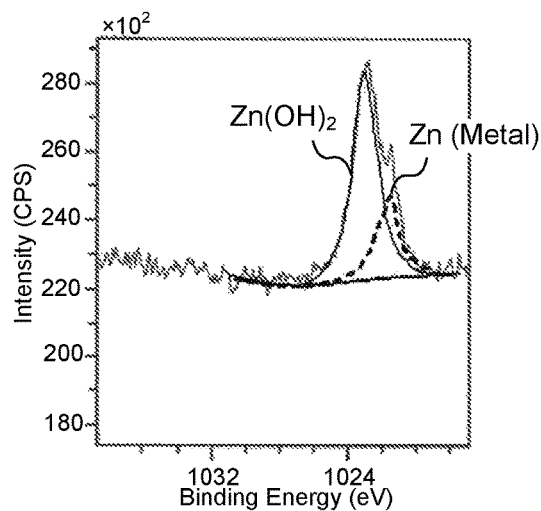
FIGS. 8A to 8D illustrate the intensity profile of the chemical binding energy corresponding to the 2p orbitals of Zn at the surface of a plating layer.
Figure 8B:
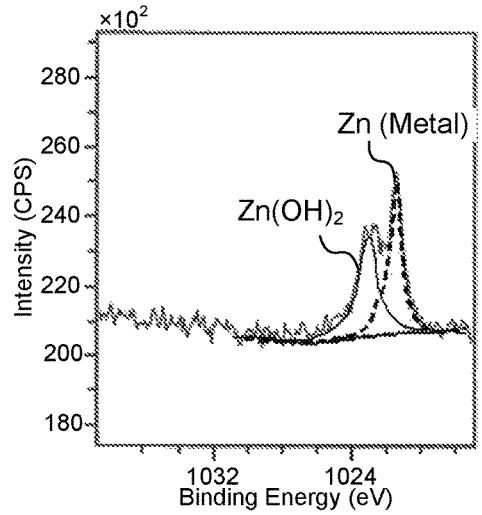
Figure 8C:
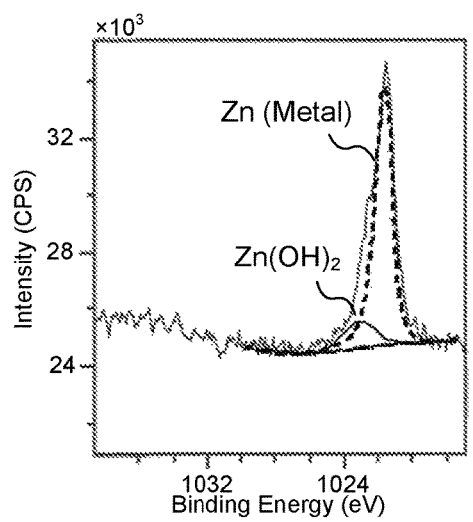
Figure 8D:
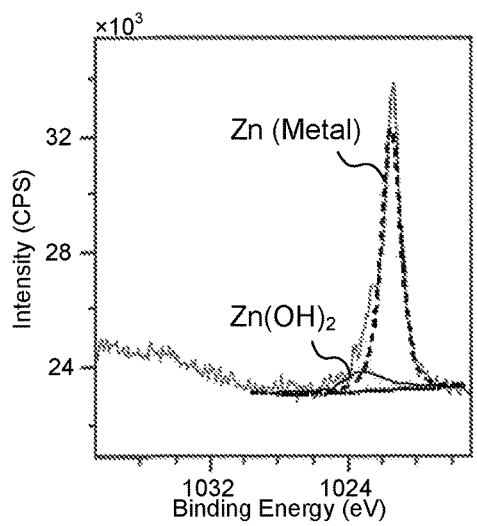

FIGS. 8A to 8D illustrate the intensity profile of the chemical binding energy corresponding to the 2p orbitals of Zn at the surface of a plating layer of the hot-dip Zn alloy-plated steel sheet. FIG. 8A illustrates the intensity profile with a $Zn(OH)_2$ ratio of approximately 80%, FIG. 8B illustrates the intensity profile with a $Zn(OH)_2$ ratio of approximately 45%, FIG. 8C illustrates the intensity profile with a $Zn(OH)_2$ ratio of approximately 15%, and FIG. 8D illustrates the intensity profile with a $Zn(OH)_2$ ratio of approximately 10%. A dotted line is the base line, a broken line is the intensity profile derived from metal Zn (a peak centered at approximately 1022 eV), and a solid line is the intensity profile derived from $Zn(OH)_2$ (a peak centered at approximately 1023 eV). In the hot-dip Zn alloy-plated steel sheet of the present invention, the $Zn(OH)_2$ ratio is 40% or less over the whole surface of the plating layer as shown in FIGS. 8C and 8D.

The XPS analysis of the surface of the plating layer of a hot-dip Zn alloy-plated steel sheet is performed using an XPS analyzer (AXIS Nova, produced by Kratos Group PLC.). The peak area derived from metal Zn and centered at approximately 1022 eV, and the peak area derived from $Zn(OH)_2$ and centered at approximately 1023 eV are calculated using software (Vision 2) attached to the XPS analyzer.

The position of the peak derived from metal Zn is precisely at 1021.6 eV, and the position of the peak derived from $Zn(OH)_2$ is precisely at 1023.3 eV. These values may change in some cases due to characteristics of XPS analysis, contamination of a sample, and charging of a sample. Those skilled in the art, however, are capable of distinguishing the peak derived from metal Zn from the peak derived from $Zn(OH)_2$.

(Production Line)

The method of producing the hot-dip Zn alloy-plated steel sheet of the present invention described above may be performed, for example, in the following production line.

Figure 9:
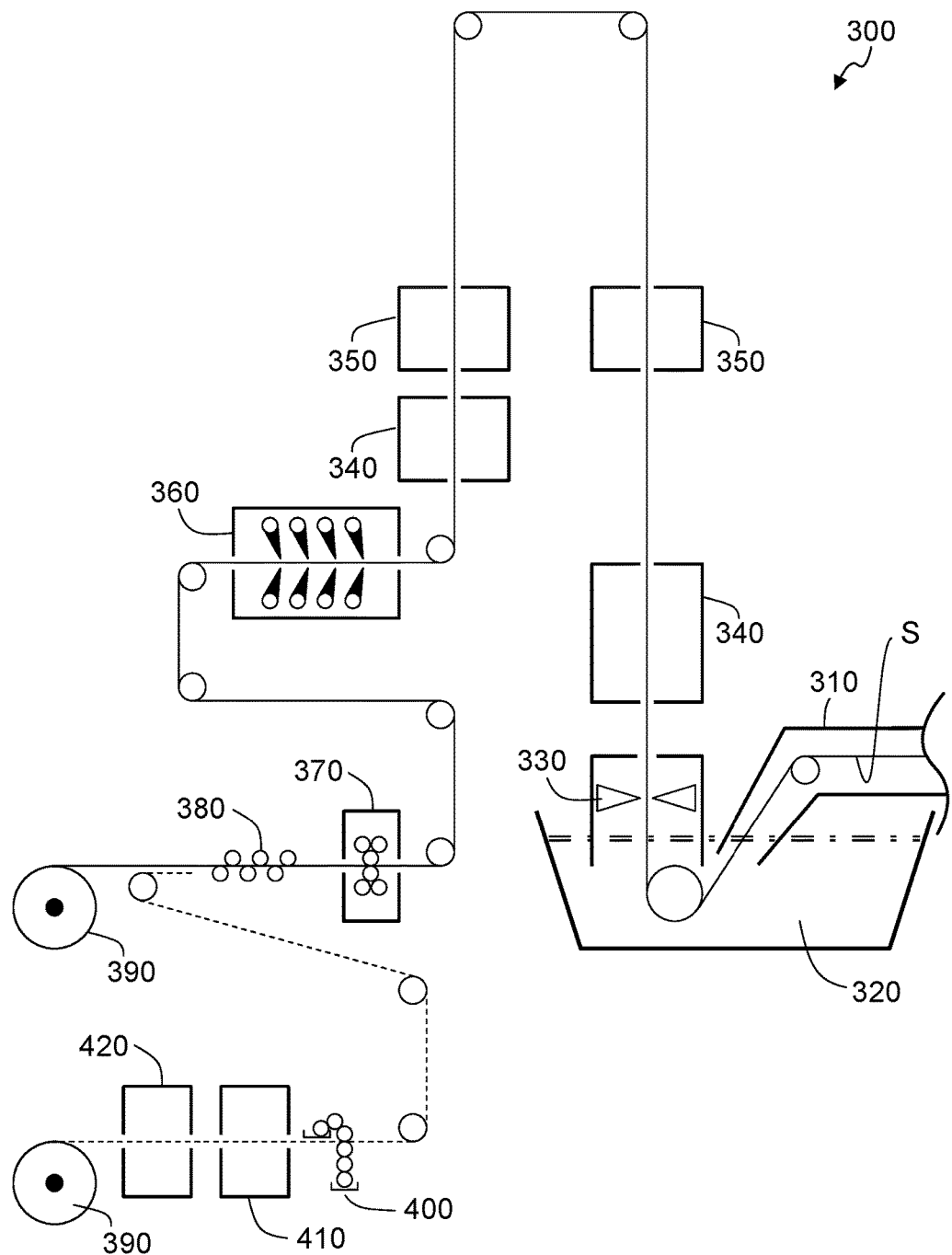
FIG. 9 is a schematic diagram illustrating the configuration of a part of the production line of a hot-dip Zn alloy-plated steel sheet.

FIG. 9 is a schematic diagram illustrating a part of production line 300 of a hot-dip Zn alloy-plated steel sheet. Production line 300 forms a plating layer on the surface of a base steel sheet (steel strip), and can continuously produce hot-dip Zn alloy-plated steel sheets. Production line 300 may further form a chemical conversion coating on the surface of the plating layer on an as needed basis, and can continuously produce plated steel sheets with chemical conversion treatment.

As shown in FIG. 9, production line 300 includes furnace 310, plating bath 320, air jet cooler 340, mist cooling zone 350, water quenching zone 360, skin pass mill 370, and tension leveler 380.

The steel strip S fed from a feeding reel not shown in drawing through a predetermined step is heated in furnace 310. The heated steel strip S is dipped in plating bath 320, so that molten metal adheres to both sides of the steel strip S. An excess amount of molten metal is then removed with a wiping apparatus having wiping nozzle 330, allowing a specified amount of molten metal to adhere to the surface of the steel strip S.

The steel strip S with a specified amount of molten metal adhered thereto is cooled to the solidifying point of the molten metal or lower by air jet cooler 340 or in mist cooling zone 350. Air jet cooler 340 is a facility for cooling the steel strip S by spraying a gas. Mist cooling zone 350 is a facility for cooling the steel strip S by spraying atomized fluid (e.g. cooling water) and a gas. The molten metal is thereby solidified, so that a hot-dip Zn alloy plating layer is formed on the surface of the steel strip S. When the steel strip s is cooled in mist cooling zone 350, no water film is formed on the surface of the plating layer. The temperature after cooling is not specifically limited, and may be, for example, 100 to 250° C.

The hot-dip Zn alloy-plated steel sheet cooled to a specified temperature is further cooled in water quenching zone 360. Water quench zone 360 is a facility for cooling the steel strip S through contact with a large amount of cooling water in comparison with mist cooling zone 350, supplying an amount of water to form a temporary water film on the surface of the plating layer. For example, water quenching zone 360 includes headers having 10 flat spray nozzles disposed at intervals of 150 mm in the width direction of the steel strip S, which are disposed in 7 rows in the feeding direction of the base steel sheet S. In water quenching zone 360, an aqueous solution containing a water-soluble corrosion inhibitor (a reduction ratio of the corrosion current density of 20% or more) is used as cooling aqueous solution. The steel strip S is cooled in water quenching zone 360, with the cooling aqueous solution in an amount to temporarily form a water film on the surface of the plating layer being supplied. For example, the cooling aqueous solution has a water temperature of approximately 20° C., a water pressure of approximately 2.5 $kgf/cm^2$, and a water quantity of approximately 150 $m^3/h$. The phrase "a water film is temporarily formed" means a state allowing a water film in contact with a hot-dip Zn alloy-plated steel sheet to be visually observed for approximately one seconds or more.

The water-cooled hot-dip Zn alloy-plated steel sheet is rolled for thermal refining by skin pass mill 370, corrected to flat by tension leveler 380, and then wound onto tension reel 390.

When a chemical conversion coating is further formed on the surface of a plating layer, a specified chemical conversion treatment liquid is applied to the surface of the hot-dip Zn alloy-plated steel sheet corrected by tension leveler 380, with roll coater 400. The hot-dip Zn alloy-plated steel sheet through the chemical conversion treatment is dried and cooled in drying zone 410 and air cooling zone 420, and then wound onto tension reel 390.

As described above, the hot-dip Zn alloy-plated steel sheet of the present invention has excellent blackening resistance and can be easily produced at high productivity. The method of producing a hot-dip Zn alloy-plated steel sheet of the present invention allows a hot-dip Zn alloy-plated steel sheet having excellent blackening resistance to be easily produced at high productivity, only by contacting a specified cooling aqueous solution with the surface of a hot-dip Zn alloy plating layer.

The present invention is described in detail with reference to Examples as follows.

The present invention is, however, not limited to the Examples.

EXAMPLES

Experiment 1

In Experiment 1, the blackening resistance of the hot-dip Zn alloy plating layer of a hot-dip Zn alloy-plated steel sheet cooled by using a cooling water containing a water-soluble corrosion inhibitor was examined 1. Production of Hot-Dip Zn Alloy-Plated Steel Sheet Using production line 300 shown in FIG. 9, hot-dip Zn alloy-plated steel sheets were produced. A hot-rolled steel strip with a sheet thickness of 2.3 mm was prepared as base steel sheet (steel strip) S. Plating was applied to the base steel sheet using the plating bath compositions and conditions described in Table 1, so that 14 types of hot-dip Zn alloy-plated steel sheets having different plating layer compositions from each other were produced. The composition of the plating bath and the composition of the plating layer are approximately the same.

that the temperature of the steel sheet (the surface of plating layer) is adjusted at 80° C., 150° C., or 300° C. immediately before passing through water quenching zone 360. In water quenching zone 360, any one of the aqueous solutions described in Table 2 and Table 3 was used as cooling aqueous solution. Each of the cooling aqueous solutions was prepared by dissolving a water-soluble corrosion inhibitor described in Table 2 or Table 3 and a dissolution promoter on an as needed basis dissolved in water with a pH of 7.6, at a specified ratio, and then adjusting the water temperature to 20° C. A cooling aqueous solution No. 42 is a water with a pH of 7.6 containing no water-soluble corrosion inhibitor and no dissolution promoter. The spray apparatus in water quenching zone 360 for use includes headers having 10 flat spray nozzles disposed at intervals of 150 mm in the width direction, which are disposed in 7 rows in the feeding direction of the base steel sheet S. Each of the cooling aqueous solutions supplied from water quenching zone 360 was under conditions with a water pressure of 2.5 kgf/cm$^2$ and a water quantity of 150 m$^3$/h.

The reduction ratio of corrosion current density of each of the cooling aqueous solutions is also described in Table 2 and Table 3. The reduction ratio of corrosion current density is the value calculated from the equation 3 (refer to FIGS. 1A and 1B). The corrosion current density is a value obtained from a polarization curve by Tafel extrapolation method. The reduction ratio of corrosion current density of each of cooling aqueous solutions Nos. 10 to 36 is 20% or more, and the reduction ratio of corrosion current density of

TABLE 1

| Plating No. | Plating bath composition (balance: Zn) (% by mass) | | | | | | Plating conditions | | |
|---|---|---|---|---|---|---|---|---|---|
| | Al | Mg | Si | Ti | B | Sb | Bath temperature (° C.) | Adhering amount (g/m$^2$) | Sheet passing speed (m/min) |
| 1 | 0.18 | — | — | — | — | 0.09 | 430 | 90 | 80 |
| 2 | 0.18 | — | — | — | — | 0.06 | 430 | 90 | 80 |
| 3 | 0.18 | — | — | — | — | — | 430 | 90 | 80 |
| 4 | 1 | 1 | — | — | — | — | 430 | 90 | 80 |
| 5 | 1.5 | 1.5 | — | — | — | — | 430 | 90 | 80 |
| 6 | 2.5 | 3 | — | — | — | — | 430 | 90 | 80 |
| 7 | 2.5 | 3 | 0.4 | — | — | — | 430 | 90 | 80 |
| 8 | 3.5 | 3 | — | — | — | — | 430 | 90 | 80 |
| 9 | 4 | 0.75 | — | — | — | — | 430 | 90 | 80 |
| 10 | 6 | 3 | — | 0.05 | 0.003 | — | 430 | 90 | 80 |
| 11 | 6 | 3 | 0.02 | 0.05 | 0.003 | — | 430 | 90 | 80 |
| 12 | 11 | 3 | — | — | — | — | 450 | 90 | 80 |
| 13 | 11 | 3 | 0.2 | — | — | — | 450 | 90 | 80 |
| 14 | 55 | — | 1.6 | — | — | — | 600 | 90 | 80 |

In production of a hot-dip Zn alloy-plated steel sheet, the cooling conditions in air jet cooler 340 were changed, such each of cooling aqueous solutions Nos. 1 to 9 and Nos. 37 to 42 is less than 20%.

TABLE 2

| | Cooling water No. | Water-soluble corrosion inhibitor (A) | | Dissolution promoter (B) | | Reduction ratio of corrosion current density (%) |
|---|---|---|---|---|---|---|
| Category | | Name | Amount added (mg/L) | Name | Ratio of amount added (B/A) | |
| Comparative Example | 1 | Sodium silicate | 0.1 | — | — | 3 |
| | 2 | Vanadium acetylacetonate | 0.1 | Ethylene diamine | 1.1 | 2 |
| | 3 | Acetylacetone vanadyl | 0.1 | Ethylene diamine | 1.3 | −2 |

TABLE 2-continued

| Category | Cooling water No. | Water-soluble corrosion inhibitor (A) Name | Amount added (mg/L) | Dissolution promoter (B) Name | Ratio of amount added (B/A) | Reduction ratio of corrosion current density (%) |
|---|---|---|---|---|---|---|
| | 4 | Vanadium oxysulfate | 0.1 | 2-Aminoethanol | 10 | 3 |
| | 5 | Vanadium pentoxide | 0.1 | 1-Amino-2-propanol | 1.1 | 5 |
| | 6 | Vanadium pentoxide | 0.1 | Tetraethylammonium hydroxide | 0.9 | −4 |
| | 7 | Vanadium pentoxide | 0.1 | 2,2'-Iminodiethanol | 0.9 | −1 |
| | 8 | Ammonium chromate | 0.1 | — | — | 2 |
| | 9 | Potassium chromate | 0.1 | — | — | 3 |
| Example | 10 | Sodium silicate | 30 | — | — | 61 |
| | 11 | Vanadium acetylacetonate | 30 | Ethylene diamine | 1.1 | 40 |
| | 12 | Acetylacetone vanadyl | 30 | Ethylene diamine | 1.3 | 45 |
| | 13 | Vanadium oxysulfate | 30 | 2-Aminoethanol | 10 | 33 |
| | 14 | Vanadium pentoxide | 30 | 1-Amino-2-propanol | 1.1 | 57 |
| | 15 | Vanadium pentoxide | 30 | Tetraethylammonium hydroxide | 0.9 | 46 |
| | 16 | Vanadium pentoxide | 30 | 2,2'-Iminodiethanol | 0.9 | 43 |
| | 17 | Ammonium chromate | 30 | — | — | 81 |
| | 18 | Potassium chromate | 30 | — | — | 72 |
| | 19 | Sodium silicate | 500 | — | — | 92 |
| | 20 | Vanadium acetylacetonate | 500 | Ethylene diamine | 1.1 | 84 |

TABLE 3

| Category | Cooling water No. | Water-soluble corrosion inhibitor (A) Name | Amount added (mg/L) | Dissolution promoter (B) Name | Ratio of amount added (B/A) | Reduction ratio of corrosion current density (%) |
|---|---|---|---|---|---|---|
| Example | 21 | Acetylacetone vanadyl | 500 | Ethylene diamine | 1.3 | 83 |
| | 22 | Vanadium oxysulfate | 500 | 2-Aminoethanol | 10 | 84 |
| | 23 | Vanadium pentoxide | 500 | 1-Amino-2-propanol | 1.1 | 84 |
| | 24 | Vanadium pentoxide | 500 | Tetraethylammonium hydroxide | 0.9 | 88 |
| | 25 | Vanadium pentoxide | 500 | 2,2'-Iminodiethanol | 0.9 | 85 |
| | 26 | Ammonium chromate | 500 | — | — | 95 |
| | 27 | Potassium chromate | 500 | — | — | 97 |
| | 28 | Sodium silicate | 3000 | — | — | 97 |
| | 29 | Vanadium acetylacetonate | 3000 | Ethylene diamine | 1.1 | 91 |
| | 30 | Acetylacetone vanadyl | 3000 | Ethylene diamine | 1.3 | 90 |
| | 31 | Vanadium oxysulfate | 3000 | 2-Aminoethanol | 10 | 91 |
| | 32 | Vanadium pentoxide | 3000 | 1-Amino-2-propanol | 1.1 | 91 |
| | 33 | Vanadium pentoxide | 3000 | Tetraethylammonium hydroxide | 0.9 | 91 |
| | 34 | Vanadium pentoxide | 3000 | 2,2'-Iminodiethanol | 0.9 | 93 |
| | 35 | Ammonium chromate | 3000 | — | — | 99 |
| | 36 | Potassium chromate | 3000 | — | — | 99 |
| Comparative Example | 37 | Chromium nitrate | 500 | — | — | −67 |
| | 38 | Chromium sulfate | 800 | — | — | −87 |
| | 39 | Cobalt sulfate | 1200 | — | — | −125 |
| | 40 | Vanadium oxysulfate | 20000 | — | — | −180 |
| | 41 | Copper chloride | 1500 | — | — | −80 |
| | 42 | — | — | — | — | 0 |

2. Evaluation of Hot-Dip Zn Alloy-Plated Steel Sheet (1) Measurement of Ratio of $Zn(OH)_2$ on Surface of Plating Layer The ratio of $Zn(OH)_2$ on the surface of plating layer was measured for each of the hot-dip Zn alloy-plated steel sheets, using an XPS analyzer (AXIS Nova, produced by Kratos Group PLC.). The ratio of $Zn(OH)_2$ was calculated using software (Vision 2) attached to the XPS analyzer.

(2) Treatment for Accelerating Deterioration of Gloss

A test piece was cut out from each of the produced hot-dip Zn alloy-plated steel sheets. Each of the test pieces was placed in a thermo-hygrostat (LHU-113, produced by Espec Corp.), and subjected to a treatment for accelerating deterioration of the gloss at a temperature 60° C., with a relative humidity of 90%, for 40 hours.

(3) Measurement of Degree of Blackening

The brightness (L* value) at the surface of the plating layer for each of the hot-dip Zn alloy-plated steel sheets was measured before and after the treatment for accelerating deterioration of the gloss. The brightness (L* value) at the surface of the plating layer was measured using a spectroscopic color difference meter (TC-1800, produced by Tokyo Denshoku Co., Ltd), by spectral reflectance measurement in accordance with JIS K 5600.

The measurement conditions are as follows:
 Optical condition: d/8° method (double beam optical system)
 Field of view: 2-degree field of view
 Measurement method: reflectometry
 Standard illuminant: C
 Color system: CIELAB Measurement wavelength: 380 to 780 nm
Measurement wavelength interval: 5 nm
Spectroscope: 1200/mm diffraction grating
Lighting: halogen lamp (voltage: 12 V, power: 50 W, rating life: 2000 hours)
Measurement area: 7.25 mm diameter
Detection element: photomultiplier tube (R928 produced by Hamamatsu Photonics K.K.)
Reflectance: 0 to 150%
Measurement temperature: 23° C.
Standard plate: white For each of the plated steel sheets, the evaluation was ranked as "A" for a difference in L* values (ΔL*) between before and after the treatment for accelerating deterioration of the gloss of less than 0.5, "B" for a difference of 0.5 or more and less than 3, and "C" for a difference of 3 or more. It can be determined that a plated steel sheet evaluated as "A" has blackening resistance.

(4) Evaluation Results

For each of the plated steel sheets, the relations among the type of the cooling aqueous solution for use, the temperature of the steel sheet (the surface of the plating layer) immediately before cooling in water quenching zone 360, the ratio of $Zn(OH)_2$, and the evaluation results of the degree of blackening are described in Table 4 to Table 7.

TABLE 4

| Category | Test piece No. | Plating No. | Cooling water No. | Sheet temperature before water cooling (° C.) | Ratio of $Zn(OH)_2$ | Blackening test result |
|---|---|---|---|---|---|---|
| Comp. Ex. | 1 | 11 | 1 | 80 | 72 | B |
| Comp. Ex. | 2 | 11 | 2 | 80 | 77 | B |
| Comp. Ex. | 3 | 11 | 3 | 80 | 72 | B |
| Comp. Ex. | 4 | 11 | 4 | 80 | 73 | B |
| Comp. Ex. | 5 | 11 | 5 | 80 | 74 | B |
| Comp. Ex. | 6 | 11 | 6 | 80 | 70 | B |
| Comp. Ex. | 7 | 11 | 7 | 80 | 70 | B |
| Comp. Ex. | 8 | 11 | 8 | 80 | 74 | B |
| Comp. Ex. | 9 | 11 | 9 | 80 | 70 | B |
| Ex. | 10 | 11 | 10 | 80 | 21 | A |
| Ex. | 11 | 11 | 11 | 80 | 28 | A |
| Ex. | 12 | 11 | 12 | 80 | 26 | A |
| Ex. | 13 | 11 | 13 | 80 | 30 | A |
| Ex. | 14 | 11 | 14 | 80 | 28 | A |
| Ex. | 15 | 11 | 15 | 80 | 25 | A |
| Ex. | 16 | 11 | 16 | 80 | 28 | A |
| Ex. | 17 | 11 | 17 | 80 | 16 | A |
| Ex. | 18 | 11 | 18 | 80 | 15 | A |
| Ex. | 19 | 11 | 19 | 80 | 9 | A |
| Ex. | 20 | 11 | 20 | 80 | 14 | A |
| Ex. | 21 | 11 | 21 | 80 | 16 | A |
| Ex. | 22 | 11 | 22 | 80 | 16 | A |
| Ex. | 23 | 11 | 23 | 80 | 14 | A |
| Ex. | 24 | 11 | 24 | 80 | 15 | A |
| Ex. | 25 | 11 | 25 | 80 | 13 | A |
| Ex. | 26 | 11 | 26 | 80 | 4 | A |
| Ex. | 27 | 11 | 27 | 80 | 5 | A |
| Ex. | 28 | 11 | 28 | 80 | 6 | A |
| Ex. | 29 | 11 | 29 | 80 | 5 | A |
| Ex. | 30 | 11 | 30 | 80 | 5 | A |
| Ex. | 31 | 11 | 31 | 80 | 3 | A |
| Ex. | 32 | 11 | 32 | 80 | 5 | A |
| Ex. | 33 | 11 | 33 | 80 | 4 | A |
| Ex. | 34 | 11 | 34 | 80 | 3 | A |
| Ex. | 35 | 11 | 35 | 80 | 5 | A |
| Ex. | 36 | 11 | 36 | 80 | 5 | A |
| Comp. Ex. | 37 | 11 | 37 | 80 | 94 | C |
| Comp. Ex. | 38 | 11 | 38 | 80 | 95 | C |
| Comp. Ex. | 39 | 11 | 39 | 80 | 94 | C |
| Comp. Ex. | 40 | 11 | 40 | 80 | 94 | C |
| Comp. Ex. | 41 | 11 | 41 | 80 | 94 | C |
| Comp. Ex. | 42 | 11 | 42 | 80 | 78 | B |

TABLE 5

| Category | Test piece No. | Plating No. | Cooling water No. | Sheet temperature before water cooling (° C.) | Ratio of $Zn(OH)_2$ | Blackening test result |
|---|---|---|---|---|---|---|
| Comp. Ex. | 43 | 11 | 1 | 150 | 88 | C |
| Comp. Ex. | 44 | 11 | 2 | 150 | 93 | C |
| Comp. Ex. | 45 | 11 | 3 | 150 | 92 | C |
| Comp. Ex. | 46 | 11 | 4 | 150 | 91 | C |
| Comp. Ex. | 47 | 11 | 5 | 150 | 93 | C |
| Comp. Ex. | 48 | 11 | 6 | 150 | 91 | C |

TABLE 5-continued

| Category | Test piece No. | Plating No. | Cooling water No. | Sheet temperature before water cooling (° C.) | Ratio of Zn(OH)$_2$ | Blackening test result |
|---|---|---|---|---|---|---|
| Comp. Ex. | 49 | 11 | 7 | 150 | 91 | C |
| Comp. Ex. | 50 | 11 | 8 | 150 | 91 | C |
| Comp. Ex. | 51 | 11 | 9 | 150 | 88 | C |
| Ex. | 52 | 11 | 10 | 150 | 26 | A |
| Ex. | 53 | 11 | 11 | 150 | 35 | A |
| Ex. | 54 | 11 | 12 | 150 | 31 | A |
| Ex. | 55 | 11 | 13 | 150 | 37 | A |
| Ex. | 56 | 11 | 14 | 150 | 34 | A |
| Ex. | 57 | 11 | 15 | 150 | 33 | A |
| Ex. | 58 | 11 | 16 | 150 | 37 | A |
| Ex. | 59 | 11 | 17 | 150 | 20 | A |
| Ex. | 60 | 11 | 18 | 150 | 19 | A |
| Ex. | 61 | 11 | 19 | 150 | 11 | A |
| Ex. | 62 | 11 | 20 | 150 | 18 | A |
| Ex. | 63 | 11 | 21 | 150 | 20 | A |
| Ex. | 64 | 11 | 22 | 150 | 20 | A |
| Ex. | 65 | 11 | 23 | 150 | 19 | A |
| Ex. | 66 | 11 | 24 | 150 | 19 | A |
| Ex. | 67 | 11 | 25 | 150 | 16 | A |
| Ex. | 68 | 11 | 26 | 150 | 5 | A |
| Ex. | 69 | 11 | 27 | 150 | 6 | A |
| Ex. | 70 | 11 | 28 | 150 | 7 | A |
| Ex. | 71 | 11 | 29 | 150 | 6 | A |
| Ex. | 72 | 11 | 30 | 150 | 6 | A |
| Ex. | 73 | 11 | 31 | 150 | 4 | A |
| Ex. | 74 | 11 | 32 | 150 | 6 | A |
| Ex. | 75 | 11 | 33 | 150 | 6 | A |
| Ex. | 76 | 11 | 34 | 150 | 3 | A |
| Ex. | 77 | 11 | 35 | 150 | 5 | A |
| Ex. | 78 | 11 | 36 | 150 | 6 | A |
| Comp. Ex. | 79 | 11 | 37 | 150 | 95 | C |
| Comp. Ex. | 80 | 11 | 38 | 150 | 95 | C |
| Comp. Ex. | 81 | 11 | 39 | 150 | 96 | C |
| Comp. Ex. | 82 | 11 | 40 | 150 | 97 | C |
| Comp. Ex. | 83 | 11 | 41 | 150 | 97 | C |
| Comp. Ex. | 84 | 11 | 42 | 150 | 90 | C |

TABLE 6

| Category | Test piece No. | Plating No. | Cooling water No. | Sheet temperature before water cooling (° C.) | Ratio of Zn(OH)$_2$ | Blackening test result |
|---|---|---|---|---|---|---|
| Comp. Ex. | 85 | 11 | 1 | 300 | 90 | C |
| Comp. Ex. | 86 | 11 | 2 | 300 | 95 | C |
| Comp. Ex. | 87 | 11 | 3 | 300 | 93 | C |
| Comp. Ex. | 88 | 11 | 4 | 300 | 93 | C |
| Comp. Ex. | 89 | 11 | 5 | 300 | 95 | C |
| Comp. Ex. | 90 | 11 | 6 | 300 | 93 | C |
| Comp. Ex. | 91 | 11 | 7 | 300 | 93 | C |
| Comp. Ex. | 92 | 11 | 8 | 300 | 91 | C |
| Comp. Ex. | 93 | 11 | 9 | 300 | 90 | C |
| Ex. | 94 | 11 | 10 | 300 | 28 | A |
| Ex. | 95 | 11 | 11 | 300 | 35 | A |
| Ex. | 96 | 11 | 12 | 300 | 33 | A |
| Ex. | 97 | 11 | 13 | 300 | 38 | A |
| Ex. | 98 | 11 | 14 | 300 | 36 | A |
| Ex. | 99 | 11 | 15 | 300 | 34 | A |
| Ex. | 100 | 11 | 16 | 300 | 37 | A |
| Ex. | 101 | 11 | 17 | 300 | 20 | A |
| Ex. | 102 | 11 | 18 | 300 | 22 | A |
| Ex. | 103 | 11 | 19 | 300 | 13 | A |
| Ex. | 104 | 11 | 20 | 300 | 18 | A |
| Ex. | 105 | 11 | 21 | 300 | 22 | A |
| Ex. | 106 | 11 | 22 | 300 | 22 | A |
| Ex. | 107 | 11 | 23 | 300 | 22 | A |
| Ex. | 108 | 11 | 24 | 300 | 20 | A |
| Ex. | 109 | 11 | 25 | 300 | 18 | A |
| Ex. | 110 | 11 | 26 | 300 | 8 | A |
| Ex. | 111 | 11 | 27 | 300 | 9 | A |
| Ex. | 112 | 11 | 28 | 300 | 9 | A |

TABLE 6-continued

| Category | Test piece No. | Plating No. | Cooling water No. | Sheet temperature before water cooling (° C.) | Ratio of Zn(OH)$_2$ | Blackening test result |
|---|---|---|---|---|---|---|
| Ex. | 113 | 11 | 29 | 300 | 9 | A |
| Ex. | 114 | 11 | 30 | 300 | 8 | A |
| Ex. | 115 | 11 | 31 | 300 | 7 | A |
| Ex. | 116 | 11 | 32 | 300 | 8 | A |
| Ex. | 117 | 11 | 33 | 300 | 8 | A |
| Ex. | 118 | 11 | 34 | 300 | 5 | A |
| Ex. | 119 | 11 | 35 | 300 | 8 | A |
| Ex. | 120 | 11 | 36 | 300 | 8 | A |
| Comp. Ex. | 121 | 11 | 37 | 300 | 95 | C |
| Comp. Ex. | 122 | 11 | 38 | 300 | 96 | C |
| Comp. Ex. | 123 | 11 | 39 | 300 | 96 | C |
| Comp. Ex. | 124 | 11 | 40 | 300 | 99 | C |
| Comp. Ex. | 125 | 11 | 41 | 300 | 99 | C |
| Comp. Ex. | 126 | 11 | 42 | 300 | 98 | C |

TABLE 7

| Category | Test piece No. | Plating No. | Cooling water No. | Sheet temperature before water cooling (° C.) | Ratio of Zn(OH)$_2$ | Blackening test result |
|---|---|---|---|---|---|---|
| Comp. Ex. | 127 | 9 | 1 | 150 | 84 | C |
| Comp. Ex. | 128 | 14 | 2 | 150 | 95 | C |
| Comp. Ex. | 129 | 2 | 3 | 150 | 89 | C |
| Comp. Ex. | 130 | 10 | 4 | 150 | 85 | C |
| Comp. Ex. | 131 | 1 | 5 | 300 | 92 | C |
| Comp. Ex. | 132 | 12 | 6 | 150 | 90 | C |
| Comp. Ex. | 133 | 5 | 7 | 150 | 90 | C |
| Comp. Ex. | 134 | 8 | 8 | 300 | 99 | C |
| Comp. Ex. | 135 | 13 | 9 | 150 | 91 | C |
| Ex. | 136 | 3 | 10 | 150 | 28 | A |
| Ex. | 137 | 10 | 11 | 150 | 32 | A |
| Ex. | 138 | 4 | 12 | 300 | 29 | A |
| Ex. | 139 | 13 | 13 | 150 | 38 | A |
| Ex. | 140 | 7 | 14 | 150 | 34 | A |
| Ex. | 141 | 12 | 15 | 150 | 33 | A |
| Ex. | 142 | 9 | 16 | 300 | 37 | A |
| Ex. | 143 | 7 | 17 | 150 | 20 | A |
| Ex. | 144 | 5 | 18 | 150 | 20 | A |
| Ex. | 145 | 12 | 19 | 150 | 10 | A |
| Ex. | 146 | 9 | 20 | 300 | 19 | A |
| Ex. | 147 | 4 | 21 | 150 | 22 | A |
| Ex. | 148 | 1 | 22 | 150 | 21 | A |
| Ex. | 149 | 14 | 23 | 150 | 19 | A |
| Ex. | 150 | 3 | 24 | 300 | 17 | A |
| Ex. | 151 | 10 | 25 | 300 | 15 | A |
| Ex. | 152 | 8 | 26 | 150 | 5 | A |
| Ex. | 153 | 13 | 27 | 150 | 7 | A |
| Ex. | 154 | 10 | 28 | 300 | 7 | A |
| Ex. | 155 | 6 | 29 | 150 | 6 | A |
| Ex. | 156 | 12 | 30 | 150 | 6 | A |
| Ex. | 157 | 5 | 31 | 150 | 5 | A |
| Ex. | 158 | 9 | 32 | 300 | 6 | A |
| Ex. | 159 | 1 | 33 | 300 | 5 | A |
| Ex. | 160 | 2 | 34 | 150 | 3 | A |
| Ex. | 161 | 13 | 35 | 300 | 6 | A |
| Ex. | 162 | 6 | 36 | 150 | 6 | A |
| Comp. Ex. | 163 | 13 | 37 | 150 | 88 | C |
| Comp. Ex. | 164 | 12 | 38 | 150 | 91 | C |
| Comp. Ex. | 165 | 10 | 39 | 300 | 103 | C |
| Comp. Ex. | 166 | 9 | 40 | 150 | 104 | C |
| Comp. Ex. | 167 | 14 | 41 | 300 | 101 | C |
| Comp. Ex. | 168 | 13 | 42 | 300 | 90 | C |

As shown in Table 4 to Table 7, in the case of cooling using an aqueous solution with a reduction ratio of corrosion current density of 20% or more, a ratio of Zn(OH)$_2$ at the surface of a plating layer became 40% or less and blackening resistance was excellent. In contrast, in the case of cooling using an aqueous solution with a reduction ratio of corrosion current density of less than 20%, a ratio of Zn(OH)$_2$ at the surface of a plating layer became more than 40% and suppression of blackening was insufficient.

From the results, it is found that cooling using an aqueous solution with a reduction ratio of corrosion current density of 20% or more allows the surface of a plating layer to have a ratio of $Zn(OH)_2$ of 40% or less, and a plated steel sheet with a plating layer having a ratio of $Zn(OH)_2$ of 40% or less at the surface of the plating layer is excellent in blackening resistance.

Experiment 2

In Experiment 2, a plating layer was formed on a base steel sheet using each of the plating bath compositions (Nos. 1 to 14) and conditions described in Table 1, so that 14 types of hot-dip Zn alloy-plated steel sheets having different plating layer compositions were produced. In production of the hot-dip Zn alloy-plated steel sheets, each of 42 types of cooling aqueous solutions described in Table 2 and Table 3 was used for cooling in water quenching zone 360. Furthermore, each of the test pieces was subjected to a chemical conversion treatment under the following chemical conversion treatment conditions A to C. Subsequently, the test piece was subjected to the treatment for accelerating deterioration of the gloss in the same manner as in Experiment 1, for the measurement of blackening resistance.

In chemical conversion treatment conditions A, ZINCHROME 3387N (chrome concentration: 10 g/L, produced by Nihon Parkerizing Co., Ltd.) was used as chemical conversion treatment liquid. The chemical conversion treatment liquid was applied to have an amount of chromium adhering of 10 mg/m² by a spray ringer roll method.

In chemical conversion treatment conditions B, an aqueous solution containing 50 g/L of magnesium phosphate, 10 g/L of potassium fluorotitanate, and 3 g/L of an organic acid was used as chemical conversion treatment liquid. The chemical conversion treatment liquid was applied to have an amount of metal components adhering of 50 mg/m² by a roll coat method.

In chemical conversion treatment conditions C, an aqueous solution containing 20 g/L of a urethane resin, 3 g/L of ammonium dihydrogen phosphate, and 1 g/L of vanadium pentoxide was used as chemical conversion treatment liquid. The chemical conversion treatment liquid was applied to have a dried film thickness of 2 μm by a roll coat method.

For each of the plated steel sheets, the relations among the type of the cooling aqueous solution for use, the temperature of the steel sheet (the surface of the plating layer) immediately before cooling in water quenching zone 360, the ratio of $Zn(OH)_2$, and the evaluation results of the degree of blackening are described in Table 8 to Table 11. Since the accurate measurement of the ratio of $Zn(OH)_2$ after the chemical conversion treatment is difficult, the ratio of $Zn(OH)_2$ is the same as the measurement value in the case of without chemical conversion treatment (the same as the values in Table 4 to Table 7).

TABLE 8

| Category | Test piece No. | Plating No. | Cooling water No. | Sheet temperature before water cooling (° C.) | Ratio of $Zn(OH)_2$ | Chemical conversion treatment | Blackening test result |
|---|---|---|---|---|---|---|---|
| Comp. Ex. | 169 | 11 | 1 | 80 | 72 | A | B |
| Comp. Ex. | 170 | 11 | 2 | 80 | 77 | B | B |
| Comp. Ex. | 171 | 11 | 3 | 80 | 72 | C | B |
| Comp. Ex. | 172 | 11 | 4 | 80 | 73 | A | B |
| Comp. Ex. | 173 | 11 | 5 | 80 | 74 | B | B |
| Comp. Ex. | 174 | 11 | 6 | 80 | 70 | C | B |
| Comp. Ex. | 175 | 11 | 7 | 80 | 70 | A | B |
| Comp. Ex. | 176 | 11 | 8 | 80 | 74 | B | B |
| Comp. Ex. | 177 | 11 | 9 | 80 | 70 | C | B |
| Ex. | 178 | 11 | 10 | 80 | 21 | A | A |
| Ex. | 179 | 11 | 11 | 80 | 28 | B | A |
| Ex. | 180 | 11 | 12 | 80 | 26 | C | A |
| Ex. | 181 | 11 | 13 | 80 | 30 | A | A |
| Ex. | 182 | 11 | 14 | 80 | 28 | B | A |
| Ex. | 183 | 11 | 15 | 80 | 25 | C | A |
| Ex. | 184 | 11 | 16 | 80 | 28 | A | A |
| Ex. | 185 | 11 | 17 | 80 | 16 | B | A |
| Ex. | 186 | 11 | 18 | 80 | 15 | C | A |
| Ex. | 187 | 11 | 19 | 80 | 9 | A | A |
| Ex. | 188 | 11 | 20 | 80 | 14 | B | A |
| Ex. | 189 | 11 | 21 | 80 | 16 | C | A |
| Ex. | 190 | 11 | 22 | 80 | 16 | A | A |
| Ex. | 191 | 11 | 23 | 80 | 14 | B | A |
| Ex. | 192 | 11 | 24 | 80 | 15 | C | A |
| Ex. | 193 | 11 | 25 | 80 | 13 | A | A |
| Ex. | 194 | 11 | 26 | 80 | 4 | B | A |
| Ex. | 195 | 11 | 27 | 80 | 5 | C | A |
| Ex. | 196 | 11 | 28 | 80 | 6 | A | A |
| Ex. | 197 | 11 | 29 | 80 | 5 | B | A |
| Ex. | 198 | 11 | 30 | 80 | 5 | C | A |
| Ex. | 199 | 11 | 31 | 80 | 3 | A | A |
| Ex. | 200 | 11 | 32 | 80 | 5 | B | A |
| Ex. | 201 | 11 | 33 | 80 | 4 | C | A |
| Ex. | 202 | 11 | 34 | 80 | 3 | A | A |
| Ex. | 203 | 11 | 35 | 80 | 5 | B | A |
| Ex. | 204 | 11 | 36 | 80 | 5 | C | A |
| Comp. Ex. | 205 | 11 | 37 | 80 | 94 | A | C |
| Comp. Ex. | 206 | 11 | 38 | 80 | 95 | B | C |
| Comp. Ex. | 207 | 11 | 39 | 80 | 94 | C | C |
| Comp. Ex. | 208 | 11 | 40 | 80 | 94 | A | C |

TABLE 8-continued

| Category | Test piece No. | Plating No. | Cooling water No. | Sheet temperature before water cooling (° C.) | Ratio of Zn(OH)$_2$ | Chemical conversion treatment | Blackening test result |
|---|---|---|---|---|---|---|---|
| Comp. Ex. | 209 | 11 | 41 | 80 | 94 | B | C |
| Comp. Ex. | 210 | 11 | 42 | 80 | 78 | B | B |

TABLE 9

| Category | Test piece No. | Plating No. | Cooling water No. | Sheet temperature before water cooling (° C.) | Ratio of Zn(OH)$_2$ | Chemical conversion treatment | Blackening test result |
|---|---|---|---|---|---|---|---|
| Comp. Ex. | 211 | 11 | 1 | 150 | 88 | A | C |
| Comp. Ex. | 212 | 11 | 2 | 150 | 93 | B | C |
| Comp. Ex. | 213 | 11 | 3 | 150 | 92 | C | C |
| Comp. Ex. | 214 | 11 | 4 | 150 | 91 | A | C |
| Comp. Ex. | 215 | 11 | 5 | 150 | 93 | B | C |
| Comp. Ex. | 216 | 11 | 6 | 150 | 91 | C | C |
| Comp. Ex. | 217 | 11 | 7 | 150 | 91 | A | C |
| Comp. Ex. | 218 | 11 | 8 | 150 | 91 | B | C |
| Comp. Ex. | 219 | 11 | 9 | 150 | 88 | C | C |
| Ex. | 220 | 11 | 10 | 150 | 26 | A | A |
| Ex. | 221 | 11 | 11 | 150 | 35 | B | A |
| Ex. | 222 | 11 | 12 | 150 | 31 | C | A |
| Ex. | 223 | 11 | 13 | 150 | 37 | A | A |
| Ex. | 224 | 11 | 14 | 150 | 34 | B | A |
| Ex. | 225 | 11 | 15 | 150 | 33 | C | A |
| Ex. | 226 | 11 | 16 | 150 | 37 | A | A |
| Ex. | 227 | 11 | 17 | 150 | 20 | B | A |
| Ex. | 228 | 11 | 18 | 150 | 19 | C | A |
| Ex. | 229 | 11 | 19 | 150 | 11 | A | A |
| Ex. | 230 | 11 | 20 | 150 | 18 | B | A |
| Ex. | 231 | 11 | 21 | 150 | 20 | C | A |
| Ex. | 232 | 11 | 22 | 150 | 20 | A | A |
| Ex. | 233 | 11 | 23 | 150 | 19 | B | A |
| Ex. | 234 | 11 | 24 | 150 | 19 | C | A |
| Ex. | 235 | 11 | 25 | 150 | 16 | A | A |
| Ex. | 236 | 11 | 26 | 150 | 5 | B | A |
| Ex. | 237 | 11 | 27 | 150 | 6 | C | A |
| Ex. | 238 | 11 | 28 | 150 | 7 | A | A |
| Ex. | 239 | 11 | 29 | 150 | 6 | B | A |
| Ex. | 240 | 11 | 30 | 150 | 6 | C | A |
| Ex. | 241 | 11 | 31 | 150 | 4 | A | A |
| Ex. | 242 | 11 | 32 | 150 | 6 | B | A |
| Ex. | 243 | 11 | 33 | 150 | 6 | C | A |
| Ex. | 244 | 11 | 34 | 150 | 3 | A | A |
| Ex. | 245 | 11 | 35 | 150 | 5 | B | A |
| Ex. | 246 | 11 | 36 | 150 | 6 | C | A |
| Comp. Ex. | 247 | 11 | 37 | 150 | 95 | A | C |
| Comp. Ex. | 248 | 11 | 38 | 150 | 95 | B | C |
| Comp. Ex. | 249 | 11 | 39 | 150 | 96 | C | C |
| Comp. Ex. | 250 | 11 | 40 | 150 | 97 | A | C |
| Comp. Ex. | 251 | 11 | 41 | 150 | 97 | B | C |
| Comp. Ex. | 252 | 11 | 42 | 150 | 90 | B | C |

TABLE 10

| Category | Test piece No. | Plating No. | Cooling water No. | Sheet temperature before water cooling (° C.) | Ratio of Zn(OH)$_2$ | Chemical conversion treatment | Blackening test result |
|---|---|---|---|---|---|---|---|
| Comp. Ex. | 253 | 11 | 1 | 300 | 90 | A | C |
| Comp. Ex. | 254 | 11 | 2 | 300 | 95 | B | C |
| Comp. Ex. | 255 | 11 | 3 | 300 | 93 | C | C |
| Comp. Ex. | 256 | 11 | 4 | 300 | 93 | A | C |
| Comp. Ex. | 257 | 11 | 5 | 300 | 95 | B | C |
| Comp. Ex. | 258 | 11 | 6 | 300 | 93 | C | C |
| Comp. Ex. | 259 | 11 | 7 | 300 | 93 | A | C |
| Comp. Ex. | 260 | 11 | 8 | 300 | 91 | B | C |
| Comp. Ex. | 261 | 11 | 9 | 300 | 90 | C | C |

TABLE 10-continued

| Category | Test piece No. | Plating No. | Cooling water No. | Sheet temperature before water cooling (° C.) | Ratio of Zn(OH)$_2$ | Chemical conversion treatment | Blackening test result |
|---|---|---|---|---|---|---|---|
| Ex. | 262 | 11 | 10 | 300 | 28 | A | A |
| Ex. | 263 | 11 | 11 | 300 | 35 | B | A |
| Ex. | 264 | 11 | 12 | 300 | 33 | C | A |
| Ex. | 265 | 11 | 13 | 300 | 38 | A | A |
| Ex. | 266 | 11 | 14 | 300 | 36 | B | A |
| Ex. | 267 | 11 | 15 | 300 | 34 | C | A |
| Ex. | 268 | 11 | 16 | 300 | 37 | A | A |
| Ex. | 269 | 11 | 17 | 300 | 20 | B | A |
| Ex. | 270 | 11 | 18 | 300 | 22 | C | A |
| Ex. | 271 | 11 | 19 | 300 | 13 | A | A |
| Ex. | 272 | 11 | 20 | 300 | 18 | B | A |
| Ex. | 273 | 11 | 21 | 300 | 22 | C | A |
| Ex. | 274 | 11 | 22 | 300 | 22 | A | A |
| Ex. | 275 | 11 | 23 | 300 | 22 | B | A |
| Ex. | 276 | 11 | 24 | 300 | 20 | C | A |
| Ex. | 277 | 11 | 25 | 300 | 18 | A | A |
| Ex. | 278 | 11 | 26 | 300 | 8 | B | A |
| Ex. | 279 | 11 | 27 | 300 | 9 | C | A |
| Ex. | 280 | 11 | 28 | 300 | 9 | A | A |
| Ex. | 281 | 11 | 29 | 300 | 9 | B | A |
| Ex. | 282 | 11 | 30 | 300 | 8 | C | A |
| Ex. | 283 | 11 | 31 | 300 | 7 | A | A |
| Ex. | 284 | 11 | 32 | 300 | 8 | B | A |
| Ex. | 285 | 11 | 33 | 300 | 8 | C | A |
| Ex. | 286 | 11 | 34 | 300 | 5 | A | A |
| Ex. | 287 | 11 | 35 | 300 | 8 | B | A |
| Ex. | 288 | 11 | 36 | 300 | 8 | C | A |
| Comp. Ex. | 289 | 11 | 37 | 300 | 95 | A | C |
| Comp. Ex. | 290 | 11 | 38 | 300 | 96 | B | C |
| Comp. Ex. | 291 | 11 | 39 | 300 | 96 | C | C |
| Comp. Ex. | 292 | 11 | 40 | 300 | 99 | A | C |
| Comp. Ex. | 293 | 11 | 41 | 300 | 99 | B | C |
| Comp. Ex. | 294 | 11 | 42 | 300 | 98 | B | C |

TABLE 11

| Category | Test piece No. | Plating No. | Cooling water No. | Sheet temperature before water cooling (° C.) | Ratio of Zn(OH)$_2$ | Chemical conversion treatment | Blackening test result |
|---|---|---|---|---|---|---|---|
| Comp. Ex. | 295 | 9 | 1 | 150 | 84 | A | C |
| Comp. Ex. | 296 | 14 | 2 | 150 | 95 | B | C |
| Comp. Ex. | 297 | 2 | 3 | 150 | 89 | C | C |
| Comp. Ex. | 298 | 10 | 4 | 150 | 85 | A | C |
| Comp. Ex. | 299 | 1 | 5 | 300 | 92 | B | C |
| Comp. Ex. | 300 | 12 | 6 | 150 | 90 | C | C |
| Comp. Ex. | 301 | 5 | 7 | 150 | 90 | A | C |
| Comp. Ex. | 302 | 8 | 8 | 300 | 99 | B | C |
| Comp. Ex. | 303 | 13 | 9 | 150 | 91 | C | C |
| Ex. | 304 | 3 | 10 | 150 | 28 | A | A |
| Ex. | 305 | 10 | 11 | 150 | 32 | B | A |
| Ex. | 306 | 4 | 12 | 300 | 29 | C | A |
| Ex. | 307 | 13 | 13 | 150 | 38 | A | A |
| Ex. | 308 | 7 | 14 | 150 | 34 | B | A |
| Ex. | 309 | 12 | 15 | 150 | 33 | C | A |
| Ex. | 310 | 9 | 16 | 300 | 37 | A | A |
| Ex. | 311 | 7 | 17 | 150 | 20 | B | A |
| Ex. | 312 | 5 | 18 | 150 | 20 | C | A |
| Ex. | 313 | 12 | 19 | 150 | 10 | A | A |
| Ex. | 314 | 9 | 20 | 300 | 19 | B | A |
| Ex. | 315 | 4 | 21 | 150 | 22 | C | A |
| Ex. | 316 | 1 | 22 | 150 | 21 | A | A |
| Ex. | 317 | 14 | 23 | 150 | 19 | B | A |
| Ex. | 318 | 3 | 24 | 300 | 17 | C | A |
| Ex. | 319 | 10 | 25 | 300 | 15 | A | A |
| Ex. | 320 | 8 | 26 | 150 | 5 | B | A |
| Ex. | 321 | 13 | 27 | 150 | 7 | C | A |
| Ex. | 322 | 10 | 28 | 300 | 7 | A | A |
| Ex. | 323 | 6 | 29 | 150 | 6 | B | A |
| Ex. | 324 | 12 | 30 | 150 | 6 | C | A |
| Ex. | 325 | 5 | 31 | 150 | 5 | A | A |

TABLE 11-continued

| Category | Test piece No. | Plating No. | Cooling water No. | Sheet temperature before water cooling (° C.) | Ratio of Zn(OH)$_2$ | Chemical conversion treatment | Blackening test result |
| --- | --- | --- | --- | --- | --- | --- | --- |
| Ex. | 326 | 9 | 32 | 300 | 6 | B | A |
| Ex. | 327 | 1 | 33 | 300 | 5 | C | A |
| Ex. | 328 | 2 | 34 | 150 | 3 | A | A |
| Ex. | 329 | 13 | 35 | 300 | 6 | B | A |
| Ex. | 330 | 6 | 36 | 150 | 6 | C | A |
| Comp. Ex. | 331 | 13 | 37 | 150 | 88 | A | C |
| Comp. Ex. | 332 | 12 | 38 | 150 | 91 | B | C |
| Comp. Ex. | 333 | 10 | 39 | 300 | 103 | C | C |
| Comp. Ex. | 334 | 9 | 40 | 150 | 104 | A | C |
| Comp. Ex. | 335 | 14 | 41 | 300 | 101 | B | C |
| Comp. Ex. | 336 | 13 | 42 | 300 | 90 | C | C |

As shown in Table 8 to Table 11, in the case of cooling using an aqueous solution with a reduction ratio of corrosion current density of 20% or more, excellent blackening resistance was obtained even with the chemical conversion treatment. In contrast, in the case of cooling using an aqueous solution with a reduction ratio of corrosion current density of less than 20%, the suppression of blackening was insufficient even with the chemical conversion treatment.

From the results, it is found that cooling using an aqueous solution with a reduction ratio of corrosion current density of 20% or more can sufficiently suppress blackening regardless of the type of chemical conversion treatment.

This application claims priority based on Japanese patent Application No. 2013-250143, filed on Dec. 3, 2013, the entire contents of which including the specification and the drawings are incorporated herein by reference.

INDUSTRIAL APPLICABILITY

The hot-dip Zn alloy-plated steel sheet obtained by the production method of the present invention is excellent in blackening resistance, and useful as plated steel sheet for use in, for example, roof materials and exterior materials for buildings, home appliances, and automobiles.

REFERENCE SIGNS LIST 100, 200 Cooling apparatus
110 Spray nozzle
120, 230 Squeeze roll
130 Housing
210 Dip tank
220 Dip roller
300 Production line
310 Furnace
320 Plating bath
330 Wiping nozzle
340 Air jet cooler
350 Mist cooling zone
360 Water quenching zone
370 Skin pass mill
380 Tension leveler
390 Tension reel
400 Roll coater
410 Drying zone
420 Air cooling zone
S: Steel strip

The invention claimed is:

1. A method of producing a hot-dip Zn alloy-plated steel sheet comprising:
    dipping a base steel sheet in a hot-dip Zn alloy plating bath to form a hot-dip Zn alloy plating layer on a surface of the base steel sheet; and
    contacting an aqueous solution containing a water-soluble corrosion inhibitor with a surface of the hot-dip Zn alloy plating layer to cool the base steel sheet and the hot-dip Zn alloy plating layer having a raised temperature through formation of the hot-dip Zn alloy plating layer,
    wherein a temperature of the surface of the hot-dip Zn alloy plating layer when the aqueous solution is to be contacted with the surface of the hot-dip Zn alloy plating layer is equal to or more than 100° C. and equal to or less than a solidifying point of the hot-dip Zn alloy plating layer; and
    wherein the aqueous solution containing the water-soluble corrosion inhibitor satisfies following Equation 1:

$$\frac{Z_0 - Z_1}{Z_0} \times 100 \geq 20 \qquad \text{(Equation 1)}$$

$Z_0$ is a corrosion current density of the hot-dip Zn alloy-plated steel sheet measured in a 0.5 M NaCl aqueous solution not containing the water-soluble corrosion inhibitor, and $Z_1$ is a corrosion current density of the hot-dip Zn alloy-plated steel sheet measured in the aqueous solution containing the water-soluble corrosion inhibitor, in which NaCl is further dissolved so that a final concentration of NaCl is 0.5 M, wherein the 0.5M NaCl aqueous solution not containing the water-soluble corrosion inhibitor has the same composition as the aqueous solution containing the water-soluble corrosion inhibitor in which NaCl is further dissolved, except for the absence of the water-soluble corrosion inhibitor.

* * * * *